United States Patent
Asano et al.

(10) Patent No.: US 7,636,827 B2
(45) Date of Patent: Dec. 22, 2009

(54) COMPUTER SYSTEM, DATA MIGRATION MONITORING METHOD AND DATA MIGRATION MONITORING PROGRAM

(75) Inventors: Masayasu Asano, Yokohama (JP); Tetsuya Maruyama, Kawasaki (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 311 days.

(21) Appl. No.: 11/603,089

(22) Filed: Nov. 22, 2006

(65) Prior Publication Data
US 2008/0086616 A1    Apr. 10, 2008

(30) Foreign Application Priority Data
Oct. 4, 2006    (JP) .............................. 2006-273241

(51) Int. Cl.
G06F 12/00 (2006.01)
G06F 13/00 (2006.01)
G06F 13/28 (2006.01)

(52) U.S. Cl. .................. 711/165; 711/162; 711/170; 711/171; 711/172; 711/173; 711/161; 709/213; 709/214; 709/215; 709/216; 709/232; 707/204

(58) Field of Classification Search .................. 711/165
See application file for complete search history.

(56) References Cited

U.S. PATENT DOCUMENTS

2002/0129216 A1* 9/2002 Collins ....................... 711/170
2003/0009619 A1  1/2003 Kano et al.
2003/0167375 A1* 9/2003 Morishita et al. ............ 711/112
2003/0172146 A1* 9/2003 Collins ........................ 709/223
2005/0193167 A1* 9/2005 Eguchi et al. ................ 711/114
2006/0047909 A1  3/2006 Takahashi et al.

FOREIGN PATENT DOCUMENTS

JP   2003-15915    1/2003
JP   2006-99748    4/2006

* cited by examiner

*Primary Examiner*—Christian P Chace
*Assistant Examiner*—Prasith Thammavong
(74) *Attorney, Agent, or Firm*—Antonelli, Terry, Stout & Kraus, LLP.

(57) ABSTRACT

A management computer monitors an allocated capacity of a source virtual volume and an allocated capacity of a virtual pool having a storage area allocated to a destination virtual volume in a storage, judges whether the allocated capacity of the source virtual volume can be covered in the virtual pool or not, and informs the user of a result that data migration fails when the allocated capacity of the source virtual volume cannot be covered. When the allocated capacity of the source virtual volume cannot be covered, the management computer uses another storage area to increase the capacity of the virtual pool. Accordingly, when data migration is performed between the virtual volumes, capacities of physical areas allocated to the source virtual volume and the destination virtual volume can be grasped so that the data migration can be performed accurately between the source virtual volume and the destination virtual volume.

9 Claims, 14 Drawing Sheets

CONFIGURATION EXAMPLE OF COMPUTER SYSTEM

CONFIGURATION EXAMPLE OF COMPUTER SYSTEM

| VIRTUAL VOLUME ID | VIRTUAL POOL ID | VIRTUAL CAPACITY | REALLY ALLOCATED CAPACITY |
|---|---|---|---|
| V1 | P1 | 10G | 4G |
| V2 | P1 | 10G | 2G |
| V3 | P2 | 10G | 0G |
| V4 | P3 | 10G | 0G |
| V5 | P3 | 6G | 2G |
| V11 | P11 | 10G | 2G |
| V12 | P12 | 10G | 2G |
| V13 | P13 | 10G | 0G |
| V14 | P13 | 10G | 0G |
| V15 | P13 | 6G | 2G |
| V70 | P20 | 2G | 0G |
| V80 | P21 | 2G | 0G |

200 201 202 203 204

| VIRTUAL POOL ID | TOTAL CAPACITY | ALLOCATED CAPACITY | THRESHOLD |
|---|---|---|---|
| P1 | 10G | 6G | 8G |
| P2 | 8G | 0G | 6G |
| P3 | 6G | 2G | 4G |
| P11 | 6G | 2G | 4G |
| P12 | 6G | 2G | 4G |
| P13 | 10G | 2G | 8G |
| P20 | 2G | 0G | |
| P21 | 2G | 0G | |

210 211 212 213 214

| REAL VOLUME ID | CAPACITY |
|---|---|
| V30 | 10G |
| V40 | 10G |
| V50 | 2G |
| V60 | 2G |

220 221 222

VIEW SHOWING VIRTUAL VOLUME TABLE, VIRTUAL POOL CAPACITY TABLE AND REAL VOLUME TABLE

VIEW SHOWING VIRTUAL POOL TABLE

| VIRTUAL VOLUME ID | VIRTUAL POOL VOLUME ID | CHUNK ID | ALLOCATED LBA | ALLOCATION STATUS |
|---|---|---|---|---|
| P1 | V100 | C11 | 0G-2G | ALLOCATED (V1) |
| P1 | V100 | C12 | 2G-4G | ALLOCATED (V1) |
| P1 | V101 | C13 | 0G-2G | ALLOCATED (V2) |
| P1 | V101 | C14 | 2G-4G | ALLOCATED (V1) |
| P1 | V101 | C15 | 4G-6G | UNALLOCATED |
| P2 | V102 | C21 | 0G-2G | UNALLOCATED |
| P2 | V102 | C22 | 2G-4G | UNALLOCATED |
| P3 | V103 | C31 | 0G-2G | ALLOCATED (V5) |
| P3 | V104 | C32 | 0G-2G | ALLOCATED (V5) |
| P3 | V104 | C33 | 2G-4G | UNALLOCATED |
| P3 | V104 | C34 | 4G-6G | UNALLOCATED |
| P11 | V105 | C111 | 0G-2G | ALLOCATED (V11) |
| P11 | V106 | C112 | 0G-2G | UNALLOCATED |
| P11 | V106 | C113 | 2G-4G | UNALLOCATED |
| P12 | V107 | C121 | 0G-2G | ALLOCATED (V12) |
| P12 | V107 | C122 | 2G-4G | UNALLOCATED |
| P12 | V107 | C123 | 4G-6G | UNALLOCATED |
| P13 | V108 | C131 | 0G-2G | ALLOCATED (V15) |
| P13 | V108 | C132 | 2G-4G | UNALLOCATED |
| P13 | V108 | C133 | 4G-6G | UNALLOCATED |
| P13 | V109 | C134 | 0G-2G | UNALLOCATED |
| P13 | V109 | C135 | 2G-4G | UNALLOCATED |
| P20 | V110 | C201 | 0G-2G | UNALLOCATED |
| P21 | V111 | C202 | 0G-2G | UNALLOCATED |

| VIRTUAL VOLUME ID | VIRTUAL POOL ID | CHUNK ID | ALLOCATED LBA |
|---|---|---|---|
| V1 | P1 | C11 | 0G-2G |
| V1 | P1 | C12 | 2G-4G |
| V1 | P1 | C14 | 4G-6G |
| V2 | P1 | C13 | 2G-4G |
| V5 | P3 | C31 | 0G-2G |
| V5 | P3 | C31 | 2G-4G |
| V11 | P11 | C111 | 2G-4G |
| V12 | P12 | C121 | 0G-2G |
| V15 | P13 | C131 | 0G-2G |

400 401 402 403 404

VIEW SHOWING VIRTUAL VOLUME ALLOCATION TABLE

FIG.5

| MIGRATION ID | SOURCE VOLUME ID | SOURCE VOLUME KIND | DESTINATION VOLUME ID | DESTINATION VOLUME KIND | MIGRATION PERMISSION | EXECUTION STATUS |
|---|---|---|---|---|---|---|
| M1 | V1 | VIRTUAL | V3 | VIRTUAL | YES | STANDBY |
| M2 | V2 | VIRTUAL | V4 | VIRTUAL | YES | STANDBY |
| M3 | V11 | VIRTUAL | V13 | VIRTUAL | NO | STANDBY |
| M4 | V12 | VIRTUAL | V14 | VIRTUAL | NO | STANDBY |
| M5 | V30 | REAL | V40 | REAL | YES | DURING EXECUTION |
| M6 | V50 | REAL | V80 | VIRTUAL | YES | STANDBY |
| M7 | V70 | VIRTUAL | V60 | REAL | YES | STANDBY |

VIEW SHOWING DATA MIGRATION TABLE

VIEW SHOWING DATA MIGRATION SETTING SCREEN

FLOW CHART SHOWING OPERATION OF
JUDGING PERMISSION OF DATA MIGRATION

FLOW CHART SHOWING OPERATION OF JUDGING PERMISSION OF DATA MIGRATION AFTER DATA MIGRATION START

FIG.9

DATA MIGRATION STATUS DISPLAY SCREEN (900)

| SOURCE VOLUME | MIGRATION PERMISSION | SOURCE VOLUME KIND | SOURCE VIRTUAL CAPACITY | SOURCE REALLY ALLOCATED CAPACITY | SOURCE REALLY ALLOCATED CAPACITY SUM | DESTINATION VOLUME | DESTINATION VOLUME KIND | DESTINATION VIRTUAL CAPACITY | DESTINATION VIRTUAL POOL | DESTINATION VIRTUAL POOL TOTAL CAPACITY | DESTINATION VIRTUAL POOL ALLOCATED CAPACITY | SOURCE REALLY ALLOCATED CAPACITY SUM + DESTINATION VIRTUAL POOL ALLOCATED CAPACITY | DESTINATION VIRTUAL POOL THRESHOLD | EXECUTION STATUS |
|---|---|---|---|---|---|---|---|---|---|---|---|---|---|---|
| V11 | NO | VIRTUAL | 10G | 4G | 6G | V13 | VIRTUAL | 10G | P13 | 10G | 4G | 10G | 8G | STANDBY |
| V12 | NO | VIRTUAL | 10G | 2G |  | V14 | VIRTUAL | 10G |  |  |  |  |  | STANDBY |
| V30 | YES | REAL | 10G |  |  | V40 | REAL | 10G |  |  |  |  |  | DURING EXECUTION |

916  
ADVICE : ADD CAPACITY OF 2GB OR MORE TO VIRTUAL POOL P13

917  
INFLUENCE ON ANOTHER VOLUME : NOT ALLOW ALLOCATION OF STORAGE AREA TO V15 (VIRTUAL POOL P13) BECAUSE OF BEING LARGER THAN THE THRESHOLD

VIEW SHOWING DATA MIGRATION STATUS DISPLAY SCREEN

FLOW CHART SHOWING OPERATION OF ADDING DESTINATION CAPACITY
IN THE CASE WHERE THE DESTINATION CAPACITY
FOR DATA MIGRATION IS INSUFFICIENT

VIEW SHOWING DATA MIGRATION GROUP TABLE

| MIGRATION ID (1201) | SOURCE VOLUME ID (1202) | DESTINATION VOLUME ID (1203) | PRIORITY (1204) |
|---|---|---|---|
| M3 | 11 | 13 | 1 |
| M4 | 12 | 14 | 2 |

VIEW SHOWING DATA MIGRATION PRIORITY TABLE

| DATA INPUT | | | | | |
|---|---|---|---|---|---|
| GROUP ID (1301) | SOURCE VOLUME (611) | DESTINATION VOLUME (612) | IMMEDIATE EXECUTION (613) | PRIORITY (1302) | ADD (614) |
| G1 | V1 | V3 | No | | |
| G1 | V2 | V4 | No | | |
|  | V30 | V40 | Yes | | |
|  | V11 | V13 | No | 1-1 | |
|  | V12 | V14 | No | 1-2 | |

621 IMMEDIATE EXECUTION

631 SET    632 CANCEL

VIEW SHOWING DATA MIGRATION GROUP SETTING SCREEN

FLOW CHART OF OPERATION USING PRIORITY
IN THE CASE WHERE A PLURALITY OF DESTINATION VIRTUAL VOLUMES
USE THE SAME VIRTUAL POOL IN DATA MIGRATION

CONFIGURATION VIEW OF ANOTHER COMPUTER SYSTEM

COMPUTER SYSTEM, DATA MIGRATION MONITORING METHOD AND DATA MIGRATION MONITORING PROGRAM

CLAIM OF PRIORITY

The present application claims priority from Japanese application JP2006-273241 filed on Oct. 4, 2006, the contents of which is hereby incorporated by reference into this application.

BACKGROUND OF THE INVENTION

1. Field of the Invention

The present invention relates to a computer system for monitoring data migration between storage areas in a storage device.

2. Description of the Related Art

In a computer system including computers and a storage device (hereinafter referred to as storage), generally, a computer (hereinafter referred to as "host computer" in order to distinguish the host computer from a management computer) uses storage areas provided by the storage for storing data. On this occasion, it is necessary to expand the capacity of a storage area (hereinafter referred to as "volume") of the storage in accordance with increase in data stored by the host computer.

As an example of expansion of a volume in the storage, it was necessary to expand the volume after the operation of the computer system was once stopped so that the computer system was allowed to use the expanded volume again. Accordingly, the aforementioned volume expansion method had a disadvantage in that transactions executed by the computer system were suspended.

As measures against such transaction suspension, there has been proposed a technique for automatically expanding an insufficient capacity of a volume in a real storage in accordance with data to be written from a host computer into the volume while capacities of volumes of the storage to be recognized by the host computer are unchanged (see US2003/0009619 A1).

In the following description, a volume which can be managed in a storage due to increase in allocation from a physical area in the storage without any change in the capacities of volumes of the storage to be recognized by the host computer is referred to as "virtual volume". In addition, a storage area of the storage for managing allocation to a virtual volume of a real physical area for expanding an insufficient capacity of the volume in accordance with data to be written from the host computer into the volume is referred to as "virtual pool" (or "virtual volume pool"). A volume to be registered in the virtual pool is referred to as "virtual pool volume".

There is necessity for performing optimal allocation in accordance with the utility value of data because of safekeeping of the data for a long term due to legal restrictions, etc. For this reason, there is a technique of data migration in accordance with the utility value of data. As an example of this technique, there has been proposed a technique for managing a plurality of volumes collectively as a group and migrating data between the volumes in a hierarchical structure with a certain characteristic (see JP-A-2006-99748).

In the techniques described in the US2003/0009619 A1 and US2006/0047909 A1, there are problem as follows.

First, data migration between volumes obtained by automatically expanding capacities of the volumes in a storage, i.e. among virtual volumes must be performed in the same manner as data migration between conventional volumes. For this reason, data migration performed between the conventional volumes must be now performed between the virtual volumes.

That is, when data migration is executed, data stored in a virtual volume as a source of the data migration (hereinafter referred to as "source virtual volume") is reflected on data in a virtual volume as a destination of the data migration (hereinafter referred to as "destination virtual volume"). When data migration is executed, there is however a problem that the data migration cannot be performed because the capacity of a physical area really allocated to the source virtual volume cannot be covered by the destination virtual volume.

In terms of data migration, the time to set a destination virtual volume and the time to really start the data migration may be different because of operation in the storage. In this case, data writing on a source virtual volume is performed even after the setting of data migration or after the start of data migration. For this reason, the capacity of the physical area really allocated to the source virtual volume changes before the data migration is completed.

SUMMARY OF THE INVENTION

Therefore, an object of the invention is to a data migration monitoring system, a data migration monitoring method and a data migration monitoring program in which when data migration is performed between virtual volumes, capacities of physical areas allocated to a source virtual volume and a destination virtual volume can be grasped so that the data migration can be performed accurately between the source virtual volume and the destination virtual volume.

In order to achieve the aforementioned object, a computer system according to the invention includes a storage system, a computer for storing data into the storage system, and a management system, the storage system having a plurality of storage media for forming a plurality of storage areas, and a controller connected to the storage media, the management computer having an interface connected to a network, and a processor connected to the interface.

In the computer system according to the invention, the controller of the storage system makes a first logical storage area and a second logical storage area correspond to at least one first storage medium and at least one second storage medium in the plurality of storage media, and allocates data storage areas to the first and second logical storage areas from the first and second storage media respectively in accordance with a write request from the computer.

The controller of the storage system sets the second logical storage area after the allocation, as an area to which data to be written from the computer into the first logical storage area are migrated, and sets a pairing relation for migrating data from the first logical storage area to the second logical storage area.

In addition, in the computer system according to the invention, the processor of the management computer monitors the capacity of the data storage area allocated to the first logical storage area and the capacity of the second storage medium to be allocated to the data storage area of the second logical storage area through the network during a period after the setting of the pairing relation for the data migration before the start of the data migration.

The processor of the management computer judges whether an area for storing data stored in the first logical storage area can be covered by the second logical storage area or not, and outputs, to an output portion connected to the processor, a result that the data migration fails if the area for storing data stored in the first logical storage area cannot be covered by the second logical storage area.

According to the invention, after a first logical storage area (source virtual volume) as a source of data migration and a second logical storage area (destination virtual volume) as a destinations of the data migration are set in the storage system, the management computer monitors the allocated capacity of a virtual pool corresponding to the really allocated capacity of the source virtual volume and the really allocated capacity of the destination virtual volume and judges every time whether data migration is allowed or not. That is, the management computer judges whether or not the really allocated capacity of the source virtual volume can be covered by the second storage medium (destination virtual pool) to which the really allocated capacity of the destination virtual volume corresponds, and sends a notice to a user when the data migration is not allowed.

Thus, the user can early find that data migration between virtual volumes is not allowed during the period after the setting of data migration and before the completion of data migration, so that there is an effect that measures against the data migration, such as measures to expand the capacity of the virtual pool related to the really allocated capacity of the destination virtual volume can be taken early.

In addition, when the allocated capacity of the virtual pool related to the really allocated capacity of the destination virtual volume cannot be covered, the capacity of the virtual pool related to the really allocated capacity of the destination virtual volume is expanded to secure the capacity of the virtual pool related to the really allocated capacity of the destination virtual volume.

In addition, the capacity of the virtual pool related to the really allocated capacity of the destination virtual volume is expanded automatically without interposition of the user at the timing when no allocated capacity of the virtual pool related to the really allocated capacity of the destination virtual volume is detected, so that the capacity of the virtual pool related to the really allocated capacity of the destination virtual volume can be covered early and beforehand.

BRIEF DESCRIPTION OF THE DRAWINGS

FIG. 2 is a view showing an example of a virtual volume table, a virtual pool capacity table and a real volume table;

FIG. 3 is a view showing an example of a virtual pool table;

FIG. 4 is a view showing an example of a virtual volume allocation table;

FIG. 5 is a view showing an example of a data migration table;

FIG. 9 is a view showing an example of a data migration status display screen;

FIG. 12 is a view showing an example of a data migration priority table;

FIG. 13 is a view showing an example of a data migration group setting screen;

DETAILED DESCRIPTION OF THE INVENTION

An embodiment of the invention will be described below in detail with reference to FIGS. 1 to 15.

Figure 1:
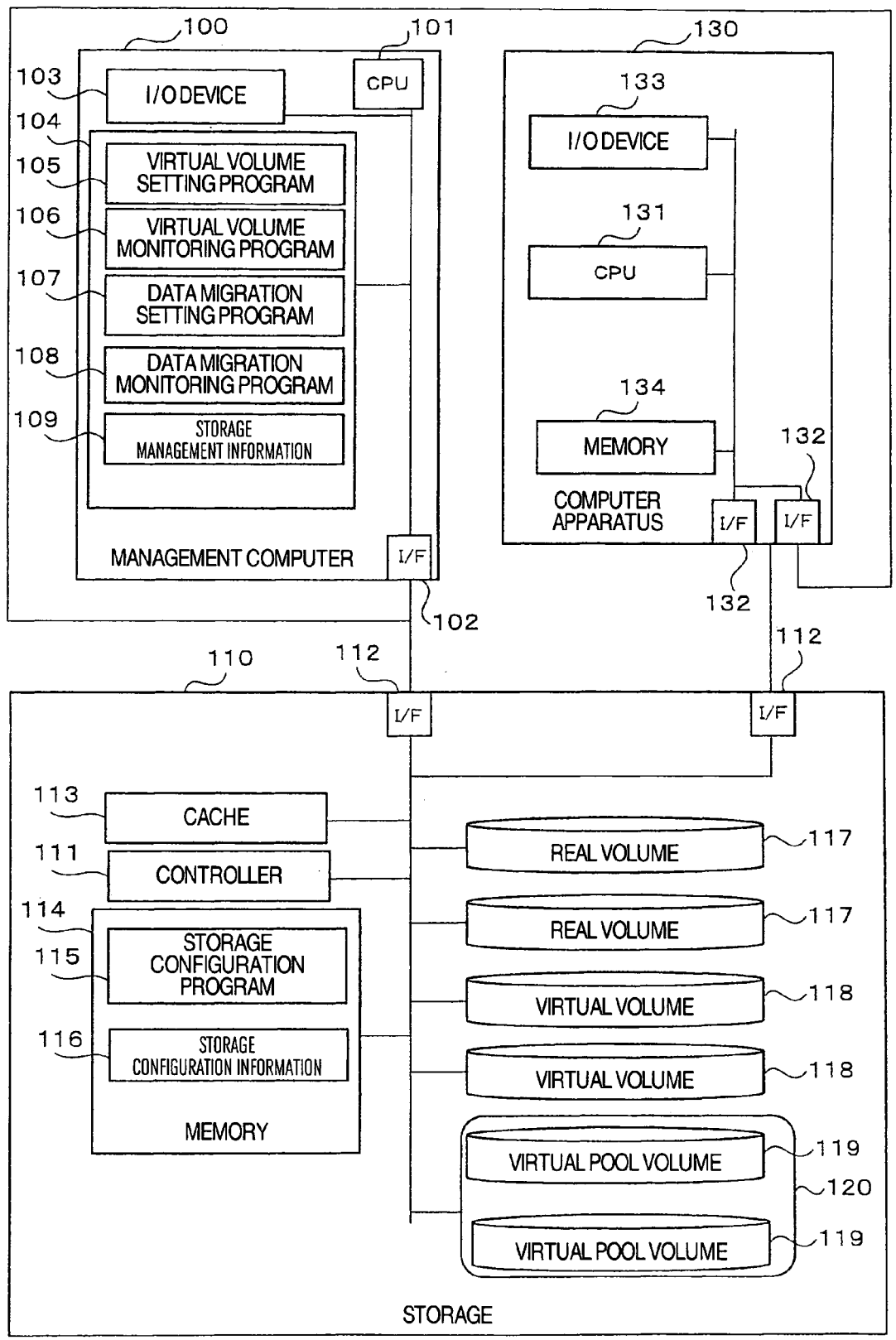
FIG. 1 is a diagram showing an example of configuration of a computer system according to an embodiment of the invention.

FIG. 1 is a diagram showing an example of systematic configuration of a computer system according to a first embodiment of the invention.

In FIG. 1, a management computer 100 is a computer for generally managing the computer system according to the invention. The management computer 100 has a CPU (Central Processing Unit) 101, an I/F (interface) 102 for communicating with a storage 110 or a host computer 130, an I/O device 103 for inputting/outputting information from/to a user, and a memory 104 for storing various programs for data migration (which will be described later) in the storage 110 and management information.

A virtual volume setting program 105 for setting virtual volumes in the storage 110, a virtual volume monitoring program 106 for monitoring the virtual volumes in the storage 110, a data migration setting program 107 for performing data migration between the virtual volumes in the storage 110, a data migration monitoring program 108 for monitoring the data migration between the virtual volumes in the storage 110 and storage management information 109 for managing the data migration between a plurality of storage areas in the storage 110 are stored in the memory 104.

The virtual volume setting program 105 is a program for executing a process of setting virtual volumes in the storage 110 in the embodiment of the invention. The data migration setting program 107 is a program for executing a process of performing data migration between the virtual volumes in the storage 110 in the embodiment of the invention.

The virtual volume monitoring program 106 is a program for executing a process of monitoring the virtual volumes in the storage 110 in the embodiment of the invention. The data migration monitoring program 108 is a program for executing a process of monitoring data migration between the virtual volumes in the storage 110 in the embodiment of the invention.

The storage management information 109 is information to be used by the virtual volume setting program 105, the virtual volume monitoring program 106, the data migration setting program 107 and the data migration monitoring program 108. The virtual volume setting program 105, the virtual volume monitoring program 106, the data migration setting program 107, the data migration monitoring program 108 are programs each of which is executed by the CPU 101.

The host computer 130 is a computer which requests the storage 110 to write data. The host computer 130 has a CPU 131, an I/F 132 for performing communication with the management computer 100 or the storage 110, an I/O device 133 for inputting/outputting information from/to a user, and a memory 134 for storing control programs and control information.

The storage 110 has a controller 111, an I/F 112, a cache 113, and a memory 114. The I/F 112 performs transmission/reception of data I/O in response to a read/write request from the host computer 130 and communication in response to an operation request from the management computer 100. The cache 113 is used as a high-speed storage device for improving data write/read performance of the storage 110. The memory 114 stores programs for creating correspondence information among a plurality of storage areas and the plurality of storage areas and executing correspondence and data migration between the plurality of storage areas.

The storage 110 further has real volumes 117, virtual volumes 118, and virtual pool volumes 119. Each of the real volumes 117 is an ordinary volume which can directly provide a storage area to the host computer 130 and which can be defined as a next virtual pool volume 119. Each of the virtual volumes 118 is a volume which is provided as a storage area to the host computer 130. The storage area per se of the virtual volume is however associated with the storage area of one or more virtual pool volumes 119 belonging to a virtual volume pool 120 providing a storage area to the virtual volume. The virtual pool volumes 119 are volumes associated with the storage areas of the virtual volumes 118 as described above. Each of the virtual pool volumes 119 can be defined by a real volume as described above. The virtual volume pool 120 is constituted by one or more virtual pool volumes 119. The virtual volume pool 120 decides the range of each virtual pool volume 119 providing a storage area to a certain virtual volume 118.

In the case of data migration, respective volumes are configured as follows. For example, with respect to a virtual volume 118 as a source of data migration (hereinafter referred to as "source virtual volume"), there are a virtual volume pool 120 providing a storage area to the source virtual volume 118 and one or more virtual pool volumes 119 constituting the virtual volume pool 120. With respect to a virtual volume 118 as a destination of data migration (hereinafter referred to as "destination virtual volume"), there are also a virtual volume pool 120 providing a storage area to the destination virtual volume 118 and one or more virtual pool volumes 119 constituting the virtual volume pool 120. Data written in the source virtual volume 118, i.e. data in the storage area of one or more virtual pool volumes 119 associated with the source virtual volume 118 are written into the destination virtual volume 118 by data migration. The written data are written into the storage area of one or more virtual pool volumes 119 associated with the destination virtual volume 118. In this manner, for example, data migration from a high writing speed virtual volume 118 to a low writing speed virtual volume 118 can be implemented.

When there are different communication modes, i.e. when, for example, the mode of communication concerned with an operation request from the management computer 100 is IP (Internet Protocol) while the mode of communication concerned with data I/O from the host computer 130 is FC (Fibre Channel), communication devices of I/Fs 112 may be disposed separately in accordance with the communication modes. Even for the same protocol, a plurality of communication devices of I/Fs 112 may be disposed in accordance with different uses or settings.

A storage configuration program 115 and storage configuration information 116 are stored in the memory 114. The storage configuration program 115 is executed by the controller 111 so that various functions of the storage configuration program 115 are implemented. The storage configuration information 116 is information used by the storage configuration program 115 and managed by the storage 110.

The storage configuration program 115 is a program for managing the configuration of the storage 110. The storage configuration program 115 has functions of the storage 110 such as a function for creating real volumes 117, virtual volumes 118, virtual pool volumes 119 and virtual volume pools 120, a function for allocating the storage areas of the virtual pool volumes 119 to the virtual volumes 118, a function for making a computer such as the host computer 130 recognize the real volumes 117 and the virtual volumes 118 through the I/F 112, a function for performing data migration between the real volumes 117 or between the virtual volumes 118, etc.

The real volumes 117 and the virtual pool volumes 119 may be storage media made of hard disks or flash memories, or may be logical volumes made of a plurality of hard disks or flash memories for implementation of volumes in an RAID (Redundant Arrays of Inexpensive Disks) configuration. Volumes of externally connected storages may be used as the real volumes 117 and the virtual pool volumes 119. A group of disks or flash memories constituting the RAID configuration will be referred to as parity group.

FIGS. 2 to 4 show information stored in the storage configuration information 116 of the storage 110 shown in FIG. 1 in the first embodiment.

The storage configuration information 116 has a virtual volume table 200 shown in FIG. 2, a virtual pool capacity table 300 shown in FIG. 3, and a virtual volume allocation table 400 shown in FIG. 4.

In FIG. 2, the virtual volume table 200 is constituted by a virtual volume ID 201 which is the identifier of a virtual volume 118, a virtual pool ID 202 showing the identifier of a virtual volume pool 120 used as a real storage area of the virtual volume 118, a virtual capacity 203 showing the capacity of the virtual volume 118 to be recognized by the host computer 130, and a really allocated capacity 204 showing the capacity of a storage area really allocated to the virtual volume 118.

As described above, the really allocated capacity of the virtual volume 118 increases in accordance with a write request from the host computer 130, etc. To make the host computer 130 recognize each virtual volume 118, information, i.e. an LUN (logical unit number) and an SCSI (Small Computer System Interface) port ID given to the virtual volume 118 may be used. In this case, the LUN and the port ID may be managed in the virtual volume table 200.

Since a destination virtual volume 118 serves as a storage area to which data are migrated from a source virtual volume 118 when data migration is performed between the virtual volumes 118, design is made so that the storage 110 prevents the host computer 130 from recognizing the storage area of the destination virtual volume 118. Accordingly, the storage 110 uses the storage configuration program 115 and the storage configuration information 116 to perform management as to whether each volume is recognized by the host computer 130 or not.

A virtual pool capacity table 210 is constituted by a virtual pool ID 211 which is the identifier of a virtual volume pool 120, a total capacity 212 indicating the total capacity of the virtual volume pool 120, an allocated capacity 213 indicating the total capacity allocated from the virtual volume pool 120 to a virtual volume 118, and a threshold 214 indicating a threshold of the allocated capacity. The threshold 214 is expressed in capacity and regarded as a material for the storage 110 to decide addition of a capacity to the virtual volume pool 120 when the allocated capacity is larger than the set threshold.

When there is no threshold set, the threshold 214 is blank. The storage 110 may perform an operation of not allocating a capacity to the virtual volume 118 when the allocated capacity is larger than the threshold. The threshold 214 may be designated by a user or may be created automatically by the storage configuration program 115 in accordance with the capacity of the virtual volume pool 120.

A real volume table 220 is constituted by a real volume ID 221 and a capacity 222. The real volume table 220 is a table for checking the capacity of each real volume.

The virtual pool table 300 shown in FIG. 3 is constituted by a virtual pool ID 301, a virtual pool volume ID 302, an allocated logical block address (hereinafter referred to as LBA) 304, a chunk ID 303, and an allocation status 305. The virtual pool ID 301 expresses an identifier of a virtual volume pool 120. The virtual pool volume ID 302 expresses an identifier of a virtual pool volume 119 belonging to the virtual pool ID 301. A LBA of an allocated storage area of the virtual pool volume 119 provided to the virtual volume pool 120 is registered in the allocated LBA 304. The chunk ID 303 is an identifier of the allocated storage area (hereinafter referred to as "chunk") corresponding to the LBA and belonging to the virtual volume pool 120. The allocation status 305 expresses an allocation status of the chunk.

The allocation status 305 expresses the allocation status by a value indicating allocated or unallocated. When the allocation status 305 indicates allocated, it means some chunk is allocated to the virtual volume 118. When the allocation status 305 indicates unallocated, it means no chunk is allocated to the virtual volume 118. When the chunk is allocated, an ID of the virtual volume 118 to which the chunk is allocated is also stored.

For example, a chunk C11 is constituted by a total 2 GB storage area starting at an address of 0 GB (as the allocated LBA 304) from the top with a virtual pool ID 301 "P1" and a virtual pool volume ID 302 "100" and ending at an address of 2 GB (as the allocated LBA 304) from the same top. The allocation status 305 indicates that the chunk C11 has been allocated to a virtual volume V1.

In the virtual pool capacity table 210 shown in FIG. 2, the total capacity 212 expresses the capacity of all chunks in each virtual volume pool 120 and the allocated capacity 213 expresses the total capacity of allocated chunks in each virtual volume pool 120.

The virtual volume allocation table 400 shown in FIG. 4 is constituted by a virtual volume ID 401, a virtual pool ID 402, an allocated LBA 404 and a chunk ID 403. The virtual volume ID 401 expresses an identifier of a virtual volume 118. The virtual pool ID 402 expresses an identifier of a virtual volume pool 120 allocated to the virtual volume 118 for data storage. A LBA of a really allocated storage area of a storage area space of the virtual volume 118 provided to the host computer 130 is stored in the allocated LBA 404. An identifier of a chunk corresponding to the LBA is stored in the chunk ID 403.

For example, a virtual volume 118 with a virtual volume ID 401 "V2" indicates that a total 2 GB storage area with the allocated LBA 404 starting at an address of 2 GB from the top and ending at an address of 4 GB from the top has been allocated as a chunk with a chunk ID 403 "C13".

FIG. 5 is an example of a table concerned with the storage management information 109 managed by the memory 104 of the management computer 100 shown in FIG. 1 in the first embodiment.

A data migration table 500 is stored in the storage management information 109 managed by the memory 104 of the management apparatus 100 shown in FIG. 1.

The data migration table 500 shown in FIG. 5 includes a migration ID 501, a source volume ID 502, a source volume kind 503, a destination volume ID 504, a destination volume kind 505, migration permission 506, and an execution status 507. The migration ID 501 is an identifier for identifying each data migration relation. The source volume ID 502 expresses a source volume. The source volume kind 503 expresses a kind of the source volume. The destination volume ID 504 expresses a volume to be a migration destination of the source volume. The destination volume kind 505 expresses a kind of the destination volume. The migration permission 506 expresses whether migration is allowed or not. The execution status 507 expresses an execution status of the data migration.

A character "virtual" or "real" is put in each of the source volume kind 503 and the destination volume kind 505. In the case where the character is "virtual", it indicates that the source volume kind 503 or the destination volume kind 505 is a virtual volume. In the case where the character is "real", it indicates that the source volume kind 503 or the destination volume kind 505 is a real volume.

A value "Yes" or "No" is put in the migration permission 506. In the case where the value is "Yes", it means that data migration from a source virtual volume to a destination virtual volume in the same row is allowed. In the case where the value is "No", it means that data migration from a source virtual volume to a destination virtual volume in the same row is not allowed.

The execution status 507 indicates whether data migration has been really performed or not. When data migration has not been executed yet, the execution status 507 indicates "standby". When data migration has been executed, the execution status 507 indicates "during execution". When data migration resulting in an error is stored in advance, the execution status 507 may indicate a status "error".

When the management computer 100 manages a plurality of storages 110, the management computer 100 puts an identifier of each of the storages 110 into the source volume ID 502 and the destination volume ID 504 in order to uniquely identify each source volume and each destination volume. When, for example, an identifier of a storage 110 as a current target of data migration is assumed to be S1, the management computer 100 manages the source volume ID 502 "V1" as "S1-V1" and the destination volume ID 503 "V3" as "S1-V3".

Figure 6:
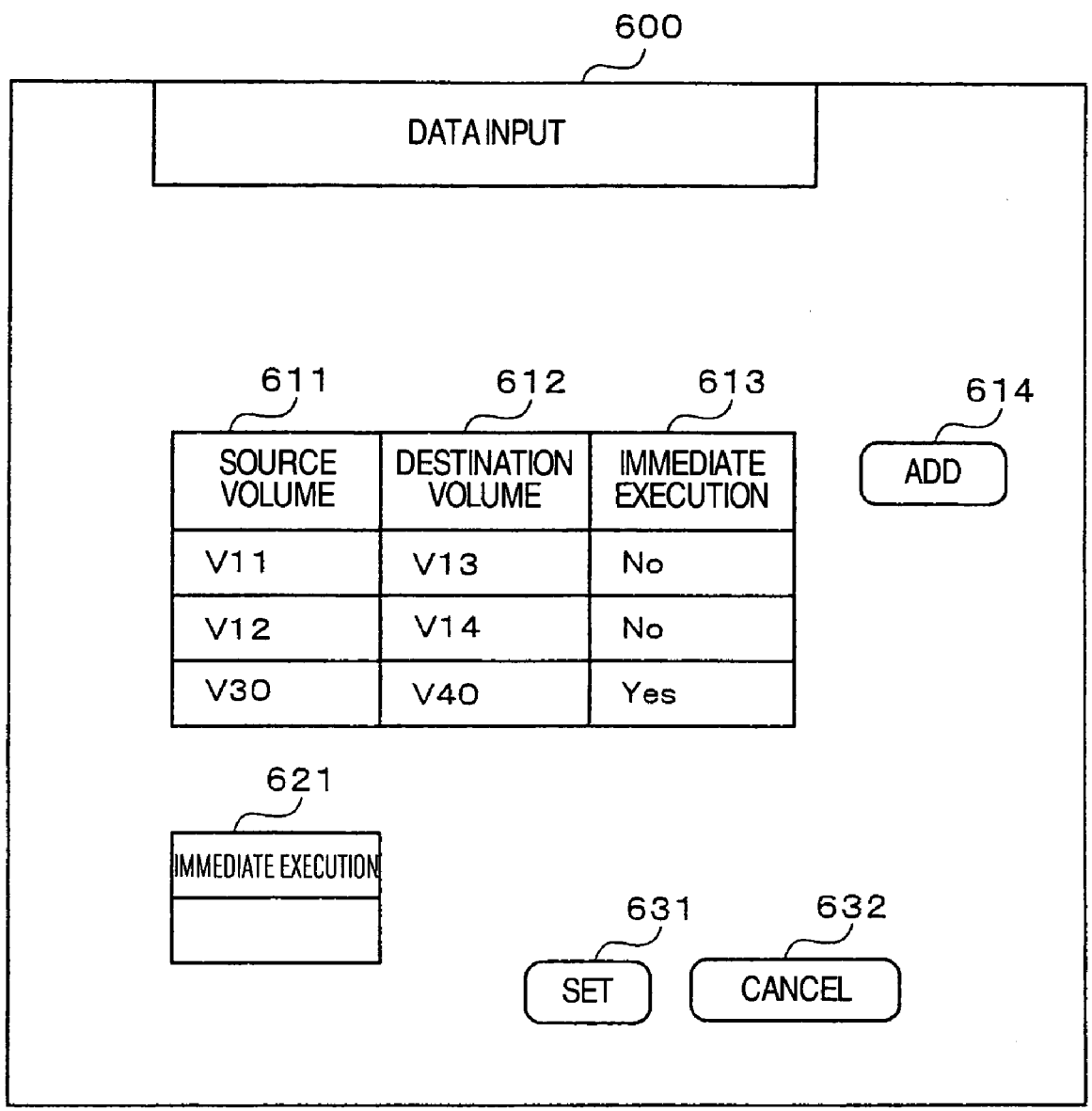
FIG. 6 is a view showing an example of a data migration setting screen.

FIG. 6 shows an input screen concerned with setting of data migration in a storage 110 to be performed by a user.

A data migration setting screen 600 shown in FIG. 6 has an input item of a source volume 611 in which the user designates a source volume and an input item of a destination volume 612 in which the user designates a designation volume. The data migration setting screen 600 also has an immediate execution 613 in which the user designates immediate execution of data migration of a corresponding item, and an immediate execution 621 in which the user designates immediate execution of data migration of all the items. Further, the data migration setting screen 600 is provided with an "add" button 614 used for addition of fields for inputting data of the source volume 611, the destination volume 612 and the immediate execution 613, a "set" button 631 giving a notice of user's input decision to the management computer 100, and a "cancel" button 632 used for cancellation of input. Identifiers of volumes are input in the source volume 611 and the destination volume 612.

The "add" button 614 is used for addition of data for data migration setting. When the "add" button 614 is pushed, columns of a source volume 611, a destination volume 612 and an immediate execution 613 are added newly as blank columns so that the user can set data in the blank columns.

The user designates "Yes" or "No" in the immediate execution 613 or 621. When the user designates "Yes" and pushes the "set" button 631, data migration is started immediately. Start of data migration is also reflected on the data migration table shown in FIG. 5, so that the execution status 507 becomes "under execution". When the designated immediate execution 613 or 621 indicates "No", the relation between the source volume 611 and the destination volume 612 is stored in the data migration table 500 shown in FIG. 5 but the execution status 507 becomes "standby".

Difference between the immediate executions 613 and 621 is as follows. The immediate execution 613 is used for setting data migration on an item. The immediate execution 621 is used for setting data migration on all the items set in the source volume 611 and the destination volume 612. Accordingly, when immediate execution is set in common on data migration set on all the items in the source volume 611 and the destination volume 612, only the immediate execution 621 may be set in place of the immediate execution 613.

When there is difference between capacities of the source volume 611 and the destination volume 612 at the time point that the user pushes the "set" button 631 or at the time point that both the source volume 611 and the destination volume 612 are designated, the storage 110 is designed not to perform data migration due to an error. In this case, the virtual volume shown in FIG. 2 is a value of the virtual capacity 203 and the real volume is a value of the capacity 222.

After the user pushes the "set" button 631, attribute of the data migration table shown in FIG. 5 may be displayed to make the user check contents of the display.

When a plurality of storages 110 are managed by the management computer 100, the user designates the source volume 611 (e.g. S1-V1) and the destination volume 612 (e.g. S1-V3) together with an identifier (e.g. S1) of corresponding one of the storages 110.

Figure 7:
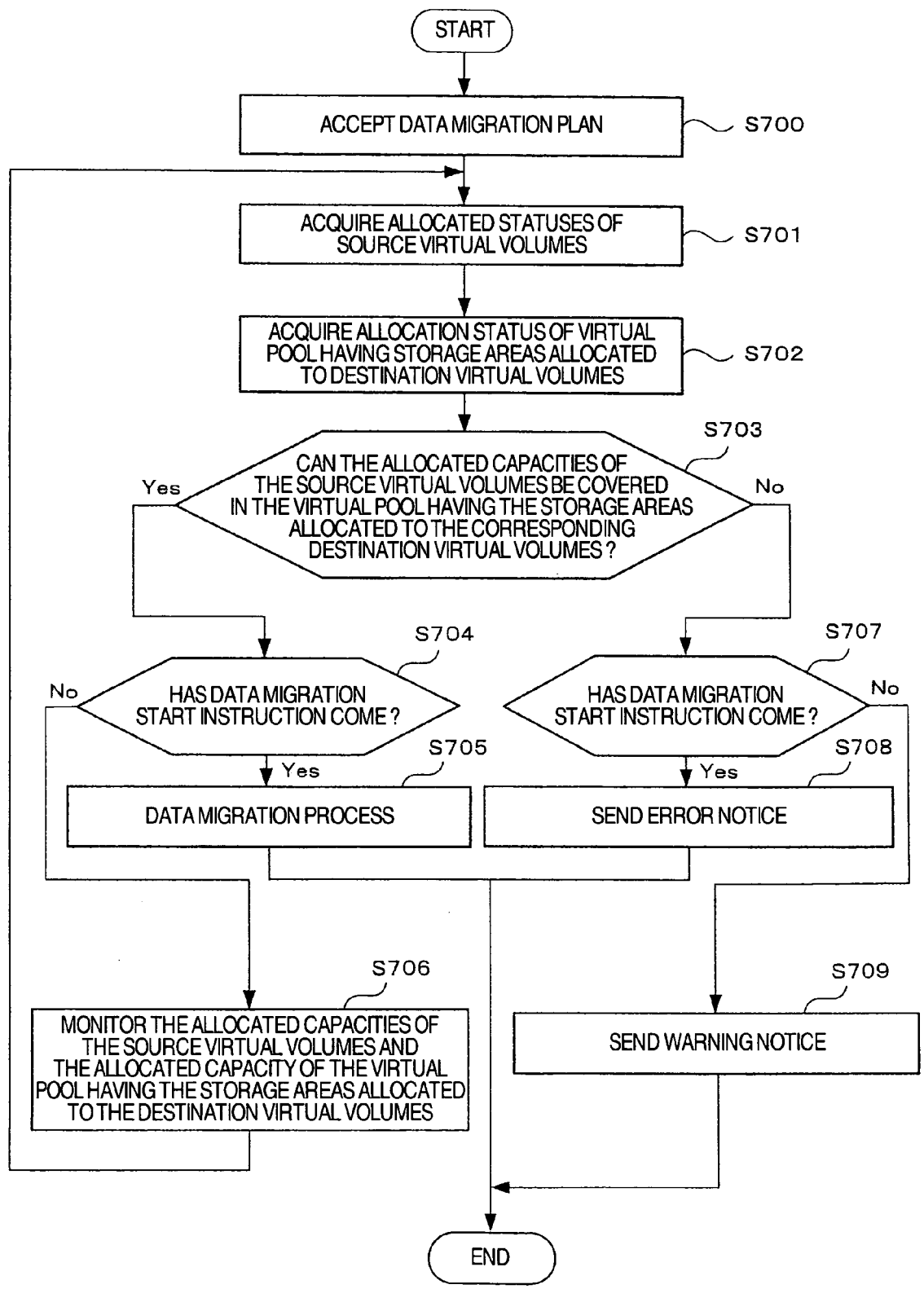
FIG. 7 is an example of a flow chart showing an operation of judging permission of data migration.

FIG. 7 is an example of a flow chart for performing a process of judging permission of data migration in the first embodiment.

In FIG. 7, each process and each judgment are performed by the CPU 101 in execution of the virtual volume monitoring program 106, the data migration setting program 107 and the data migration monitoring program 108 of the management computer 100.

First, the CPU 101 in execution of the data migration setting program 107 accepts a data migration plan (data migration setting) from a user (step S700). In the step S700, the user performs setting on the storage 110 through the data migration setting screen 600 shown in FIG. 6. With the user's pushing the "set" button 631 in FIG. 6 as a trigger, the CPU 101 stores information of the data migration setting shown in FIG. 6 in the table migration table shown in FIG. 5, and then proceeds with step S701.

For example, in accordance with the example of FIG. 6, it is understood that a combination of a source volume 611 "V11" and a destination volume 612 "V13" (hereinafter described as "V11-V13"), a combination of a source volume 611 "V12" and a destination volume 612 "V14" (hereinafter described as "V12-V14"), and a combination of a source volume 611 "V30" and a destination volume 612 "V40" (hereinafter described as "V30-V40") are set as information of data migration setting.

Next, the CPU 101 in execution of the virtual volume monitoring program 106 acquires the allocated capacities of the source virtual volumes from the virtual volume table 200 of the storage configuration information 116 shown in FIG. 2 (step S701). The allocated capacities of the source virtual volumes are acquired from the storage configuration information 116 through the storage configuration program 115 of the storage 110 based on the user's data migration request shown in FIG. 6. Then, the CPU 101 proceeds with step S702. Incidentally, the storage configuration program 115 of the storage 110 is executed by the controller 111.

For example, in data migration with the combinations of the source volumes 611 and the destination volumes 612 as V11-V13, V12-V14 and V30-V40, it is understood that the source volumes V11 and V12 are virtual volumes, from the fact that virtual capacities 203 are allocated to the source volumes V11 and V12 in the virtual volume table 200 of FIG. 2. Accordingly, the CPU 101 acquires really allocated capacities 204 of the virtual volumes V11 and V12. In accordance with the example of FIG. 2, it is understood that the really allocated capacity 204 of the virtual volume V11 is 2 G and the really allocated capacity 204 of the virtual volume V12 is 2 G.

Next, the CPU 101 in execution of the virtual volume monitoring program 106 acquires an allocation status of a virtual pool having storage areas allocated to the destination virtual volumes, in accordance with the user's data migration request shown in FIG. 6 (step S702). That is, in the step S702, the CPU 101 acquires the allocation status of the virtual pool from the virtual volume table 200 of the storage configuration information 116 shown in FIG. 2 and the virtual pool table 300 shown in FIG. 3, through the storage configuration program 115 of the storage 110. Then, the CPU 101 proceeds with step S703. Incidentally, the storage configuration program 115 of the storage 110 is executed by the controller 111.

For example, in data migration with the combinations of the source volumes 611 and the destination volumes 612 as V11-V13, V12-V14 and V30-V40, it is understood from the virtual volume table 200 in FIG. 2 that the destination volumes V13 and V14 are virtual volumes and storage areas are allocated to the destination volumes V13 and V14 from the virtual pool P13. That is, as shown in FIG. 2, a virtual capacity 203 and a virtual pool ID 202 are allocated to each of the destination volumes V13 and V14 in the virtual volume table 200. Accordingly, the CPU 101 acquires the allocation status of the virtual pool ID 202 "P13". In accordance with the example of the virtual pool capacity table 210 in FIG. 2, it is understood that an allocated capacity 213 of the virtual pool with the virtual pool ID 211 "P13" is 2 G.

The CPU 101 in execution of the data migration monitoring program 108 judges whether the allocated capacity of each source volume acquired in the step S701 can be covered or not (step S703). This judgment is performed based on whether the virtual pool having a storage area allocated to each destination virtual volume acquired in the step S702 has an allocated capacity or not. When the judgment in the judgment step S703 leads to a conclusion that the capacity can be covered, the CPU 101 proceeds with step S704. When the judgment in the judgment step S703 leads to a conclusion that the capacity cannot be covered, the CPU 101 proceeds with step S707. In the judgment step S703, judgment is made as to whether or not the capacity based on the allocated capacity 213 of the virtual pool in the virtual pool capacity table 210 of FIG. 2 can be covered to be not larger than the threshold 214.

For example, in data migration with the combinations of the source volumes 611 and the destination volumes 612 as V11-V13, V12-V14 and V30-V40, the CPU 101 judges whether or not the allocated capacities of the source virtual volumes V11 and V12 can be covered from the virtual pool P13 having the storage areas allocated to the destination virtual volumes V13 and V14.

In accordance with the step S701 and the step S702, it is understood that the allocated capacity of the source volume V11 is 2 G, the allocated capacity of the source volume V12 is 2 G, and the allocated capacity of the virtual pool P13 having the storage areas allocated to the destination virtual volumes V13 and V14 is 2 G. Accordingly, the total of the allocated capacities of the source virtual volumes V11 and V12 is 4 G, and the allocated capacity of the virtual pool P13 having the storage areas allocated to the destination virtual volumes V13 and V14 is 2 G, so that it is necessary to cover a total capacity of 6 B in the virtual pool P13 having the storage areas allocated to the destination virtual volumes V13 and 14.

When viewing a value of the threshold 214 of the virtual pool capacity table 210 of FIG. 2 concerned with the virtual pool P13 having the storage areas allocated to the destination virtual volumes V13 and V14, it is understood that the value is 8 G. Accordingly, in this case, the process proceeds to the step S704 on the basis of the decision that the capacity can be covered by the virtual capacity pool P13 having the storage areas allocated to the destination virtual volumes V13 and V14.

In data migration with the combination of the source volume 611 and the destination volume 612 as V30-V40, it is understood from the real volume ID 221 of the real volume table 220 in FIG. 2 that the migration destination is not a virtual volume but a real volume directly. Thus, the process proceeds to the step S704 on the basis of the decision that allocation is allowed.

In the step S704 and the step S707, the CPU 101 in execution of the data migration monitoring program 108 judges whether there has come a data migration start instruction or not. When, for example, the immediate execution 613 is "Yes" in the data migration setting screen 600 shown in FIG. 6, or when, for example, there has come a data migration start request due to an instruction from the user or an instruction from the management computer 110 or the host computer 130 even in data migration set to be "standby", the CPU 101 decides that there has come a data migration start instruction.

When the judgment in the judgment step S704 leads to a conclusion that there has come the data migration start instruction, the process proceeds to step S705. Otherwise, the process proceeds to step S706. When the judgment in the judgment step S707 leads to a conclusion that there has come the data migration start instruction, the process proceeds to step S708. Otherwise, the process proceeds to step S709.

For example, in accordance with the example of data migration with the combinations of the source volumes 611 and the destination volumes 612 as V11-V13, V12-V14 and V30-V40, it is understood that the process proceeds to the judgment step S704 based on the decision in the judgment step S703 that the aforementioned capacity can be covered. Among the data migrations, data migration having the immediate execution 613 indicating "Yes" in the data migration setting screen 600 shown in FIG. 6 is the combination V30-V40 of the source volume 611 and the destination volume 612, so that it is understood that the process in the case of this data migration proceeds to the step S705. Since the immediate execution 613 in the data migration setting screen 600 shown in FIG. 6 indicates "No" for data migration with the combinations of the source volumes 611 and the destination volumes 612 as V11-V13 and V12-V14, the process proceeds to the step S706.

In the step S705, the CPU 101 in execution of the data migration setting program 107 issues an instruction to the controller 111 of the storage 110 to start the data migration. Then, the CPU 101 terminates the process. When the judgment in the judgment step S704 leads to a conclusion that there has not come the data migration start instruction yet, the CPU 101 may perform monitoring etc. in the step S706 until the data migration start instruction has come, and then the CPU 101 may perform management until the data migration in the step S705 is completed.

For example, in the aforementioned data migration example, the immediate execution 613 in the data migration setting screen 600 shown in FIG. 6 indicates "Yes" for the data migration with the combination V30-V40 of the source volume 611 and the destination volume 612, so that it is understood that the CPU 101 proceeds with the step S705. Accordingly, the CPU 101 starts data migration in the step S705 in accordance with the data migration setting. Then, the operation based on the flow chart is terminated.

When the judgment in the judgment step S704 leads to a conclusion that there has not come the data migration start instruction yet, the CPU 101 in execution of the virtual volume monitoring program 106 monitors the allocated capacities of the source virtual volumes and the allocated capacity of the virtual pool having the storage areas allocated to the destination virtual volumes (step S706). The CPU 101 returns to the step S701 so as to repeat the processes and judgments from the step S701 to the step S704.

The monitoring method in the step S706 may be performed in such a manner that the CPU 101 in execution of the virtual volume monitoring program 106 is informed of occurrence of allocation in a virtual volume or the virtual pool by the storage configuration program 115 of the storage 110 or the CPU 101 acquires information periodically from the storage configuration program 115 of the storage 110. At the timing when the CPU 101 acquires data from the controller 111 of the storage 110, the process proceeds to the step S701. The time when the judgment in the judgment step S704 leads to a conclusion that data migration start instruction has been received may be set as the timing for the CPU 101 to acquire data from the controller 111 of the storage 110, i.e. the timing for the CPU 101 to return to the step S701.

When, for example, the immediate execution 613 in the data migration setting screen 600 shown in FIG. 6 in the aforementioned data migration example indicates "No" for the data migrations with the combinations of the source volumes 611 and the destination volumes 612 as V11-V13 and V12-V14, it is understood that the CPU 101 proceeds with the step S706. The CPU 101 monitors the statuses of the allocated capacities of the source virtual volumes V11 and V12 for these data migrations and the status of the allocated capacity of the virtual pool P13 having the storage areas allocated to the destination virtual volumes V13 and V14. In accordance with the timing to acquire data from the controller 111 of the storage 110, the CPU 101 returns to the step S701.

Assume that allocation of a storage area of 2 G to an added virtual volume V15 from the virtual pool P13 having the storage areas allocated to the destination virtual volumes V13 and V14 occurs when the CPU 101 is performing monitoring in the step S706.

On that occasion, the allocated capacities of the source virtual volumes V11 and V12 remain unchanged in the step S701 but the allocated volume of the virtual pool P13 having the storage areas allocated to the destination virtual volumes V13 and V14 is increased by the 2 G allocated to the added virtual volume V15 in the step S702.

On this occasion, a really allocated capacity 204 in information about a virtual volume ID 201 "V15" in the virtual volume table 200 shown in FIG. 2 is updated from 2 G to 4 G and the allocated capacity 213 in the information about the virtual pool ID 211 "P13" in the virtual pool capacity table 210 is updated from 2 G to 4 G. In addition, an allocation status 305 of a chunk ID 303 "C132" in the virtual pool table 300 shown in FIG. 3 is updated from "unallocated" to "allocated (V15)". Information of the virtual volume V15 is added in information of a virtual volume ID 401 in the virtual volume allocation table 400 shown in FIG. 4. Information about the virtual volume ID 401 "V15", a virtual pool ID 402 "P13", a chunk ID 403 "C132" and an allocated LBA 403 "2 G-4 G" is updated.

Also in this case, in the judgment step S703, it is understood that the capacity can be covered in the virtual pool P13 because the allocated capacity of the virtual pool P13 does not exceed 8 G which is the threshold 214 of the virtual pool P13 in the condition that the allocated capacity of the source virtual volume V11 is 2 G and the allocated capacity of the source virtual volume V12 is 2 G, i.e. the total of the allocated capacities of the virtual volumes V11 and V12 is 4 G, and the allocated capacity of the virtual pool P13 related to the destination virtual volumes V13 and V14 is still 4 G. Accordingly, the CPU 101 proceeds directly with the step S704 and the step S706 in which the CPU 101 continuously monitors the statuses of the allocated capacities of the source virtual volumes V11 and V12 for these data migrations and the status of the allocated capacity of the virtual pool P13 having the storage areas allocated to the destination virtual volumes V13 and V14.

Assume that allocation of 2 G to the source virtual volume V11 occurs due to data writing of the host computer 130 when the CPU 101 is performing management by monitoring the status of the allocated capacity of the virtual pool P13 in the step S706. On that occasion, the allocated capacity of the source virtual volume V11 becomes 4 G in the step S701. On this occasion, the really allocated capacity 204 in information of the virtual volume ID 201 "V11" in the virtual volume table 200 shown in FIG. 2 is updated from 2 G to 4 G and the allocated capacity 213 in information of a virtual pool ID 211 "P11" in the virtual pool capacity table 210 is updated from 2 G to 4 G.

An allocation status 305 of a chunk ID 303 "C112" in the virtual pool table 300 shown in FIG. 3 is updated from "unallocated" to "allocated (V11)". Information of the virtual volume V11 is added to information of a virtual volume ID 401 in the virtual volume allocation table 400 shown in FIG. 4. Information about the virtual volume ID 401 "V11", a virtual pool ID 402 "P11", a chunk ID 403 "C112" and an allocated LBA 404 "0 G-2 G" is updated.

In the judgment step S703, the allocated capacity of the source virtual volume V11 is 4 G and the allocated capacity of the source virtual volume V12 is 2 G, i.e. the total of the allocated capacities of the virtual volumes V11 and V12 is 6 G. The allocated capacity of the virtual pool P13 having the storage areas allocated to the destination virtual volumes V13 and V14 is 4 G. Accordingly, a capacity of 10 G in total needs to be covered in the virtual pool P13 having the storage areas allocated to the destination virtual volumes V13 and V14.

It is understood that the necessary capacity is larger than 8 G which is the threshold 214 of the virtual pool P13 having the storage areas allocated to the destination virtual volumes V13 and V14. Accordingly, it is understood that the capacity cannot be covered in the virtual pool P13 having the storage areas allocated to the destination virtual volumes V13 and V14. Here, if the threshold 214 is 10 G (or none), the capacity can be covered so that the process can proceed to the next step.

In this case, although the allocated capacity can be covered in the virtual pool P13 having the storage areas allocated to the destination virtual volumes V13 and V14 if the allocated capacity is for one of the source virtual volumes V11 and V12, it is however necessary to decide the priority in ensuring the one of the source virtual volumes V11 and V12. For this reason, when the judgment in the judgment step S703 leads to a conclusion that the allocated capacities of both the source virtual volumes V11 and V12 cannot be covered in the virtual pool P13 having the storage areas allocated to the destination virtual volumes V13 and V14, the CPU 101 decides that the capacities cannot be covered in the virtual pool P13 having the storage areas allocated to the destination virtual volumes V13 and V14, and then, the CPU 101 proceeds with the step S707.

Description will be given later to an embodiment in which the process is performed after one of the source virtual volumes V11 and V12 is selected. As will be described later, when data migrations with combinations V11-V13 and V12-V14 of the source volumes 611 and the destination volumes 612 are set to be performed by batch processing and simultaneously, the CPU 101 decides that the capacities cannot be covered in the same manner as described above, and then the CPU 101 proceeds with the step S707.

In the case of the data migrations with the combinations of the source volumes 611 and the destination volumes 612 as V11-V13 and V12-V14, the CPU 101 judges in the judgment step S707 whether a data migration start instruction has come or not. Since the immediate execution 613 for the data migration setting in this case indicates "No" as shown in FIG. 6, the CPU 101 decides in the judgment step S707 that the data migration start instruction has not come from the storage 110 or the management computer 100. On this occasion, the process proceeds to the step S709. When the judgment in the judgment step S707 leads to a conclusion that the data migration start instruction has come, the process proceeds to the step S708.

In the step S708, the CPU 101 in execution of the data migration monitoring program 108 decides that the data migrations are not allowed, so that the CPU 101 sends a notice of an error to the storage 110 or the management computer 100. Then, the process is terminated.

For example, in the aforementioned example, since the judgment in the judgment step S707 leads to a conclusion that the data migration start instruction has come, the CPU 101 decides that the data migrations with the combinations of the source volumes 611 and the destination volumes 612 as V11-V13 and V12-V14 cannot be executed any more due to increase in the allocated capacity of the added virtual volume V15, so that the CPU 101 sends a notice of an error to the user of storage 110 or the management computer 100.

In the step S709, the CPU 101 in execution of the data migration monitoring program 108 warns the user of the storage 110 or the management computer 100 that the data migrations are not allowed at the present time. Then, the process is terminated.

For example, in the aforementioned example, since the judgment in the judgment step S707 leads to a conclusion that the data migration start instruction has not come, the data migrations with the combinations of the source volumes 611 and the destination volumes 612 as V11-V13 and V12-V14 are not allowed at the present time due to increase in the allocated capacity of the added virtual volume V15. Accordingly, the CPU 101 sends the user of the storage 110 or the management computer 100 a notice of addition of a capacity to the virtual pool P13 which will have the storage areas allocated to the destination virtual volumes V13 and V14.

In the step S709, the CPU 101 may present, to the storage 110 or the management computer 100, how to solve shortage of the capacity of the virtual pool P13 having the storage areas allocated to the destination virtual volumes V13 and V14. For example, if there is a shortage of a capacity of 2 G, the CPU 101 can cover the capacity of 2 G and create a volume from the same parity group as that of the virtual pool P13 having the storage areas allocated to the destination volumes V13 and V14. While giving warning, the CPU 101 may issue an instruction to register the created volume as a virtual pool volume 119 of the virtual pool P13 short of capacity, in the storage configuration information 116.

The CPU 101 may create a volume from another parity group and give a notice to register the created volume as a virtual pool volume 119 of the virtual pool P13 short of capacity, in the storage configuration information 116. Because of the reasons of maintenance of data in the data migration, hierarchical management of the storage 110, etc., a rule that the virtual pool volume 119 of the virtual pool P13 having the storage areas allocated to the destination volumes V13 and V14 is prevented from being created from the parity group used by the source virtual volumes V11 and V12 may be provided in the storage configuration information 116.

In that case, even when a large capacity for volume creation remains in the parity group used by the destination virtual volumes V13 and V14, the CPU 101 may give warning that the capacity is insufficient in the condition that almost all the capacity has been used by the parity group used in the virtual pool P13 as a destination of data migration. In this case, the user may insert another disk in the storage 110 as a measure for creating a new parity group, in order to create a volume.

Data migration to a virtual volume from a real volume with a combination of a source volume ID 502 and a destination volume ID 505 as "V50-V80" or data migration from a virtual volume to a real volume with a combination of a source volume ID 502 and a destination volume ID 505 as "V70-V60" as shown in the data migration table 500 of FIG. 5 may be applied to the process of the aforementioned flow chart without any bad influence.

In terms of the data migration from the real volume to the virtual volume with the combination of the source volume ID 502 and the destination volume ID 505 as "V50-V80", the source virtual volume V80 needs to prepare the capacity of the real volume V50. Accordingly, the destination virtual volume V80 is also required to have a uniformly equal capacity to that of the real volume V50. Thus, the process of FIG. 7 can be dispensed with.

In terms of data migration from a virtual volume to a real volume as a combination "V70-V60" of the source volume ID 502 and the destination volume ID 505, the process of FIG. 7 can be dispensed with because the real volume V60 is also required to have a capacity uniformly equal to the virtual capacity of the virtual volume V70 regardless of the allocated capacity of the virtual volume V70 in consideration of capacity display on the host side.

Figure 8:
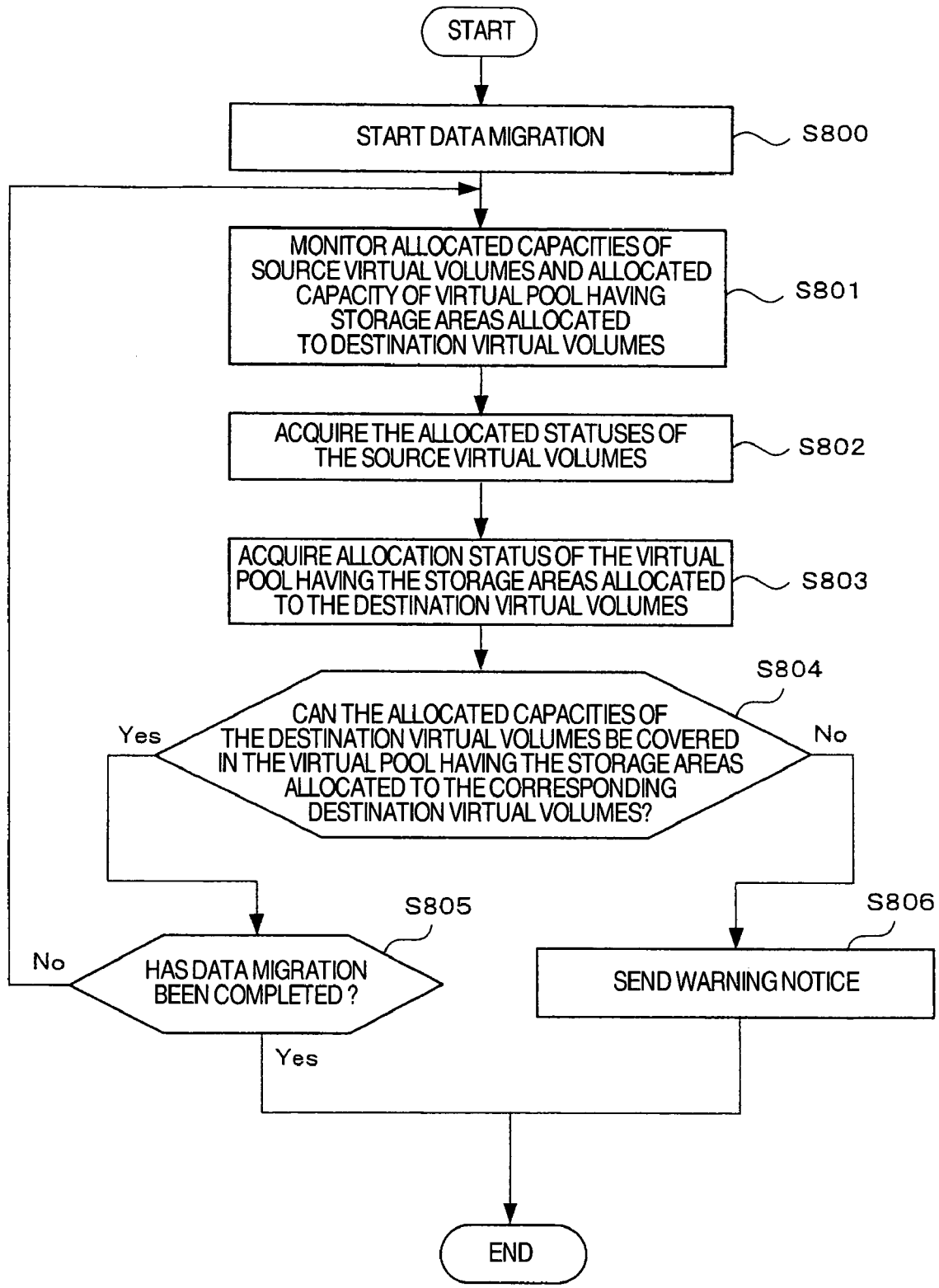
FIG. 8 is an example of a flow chart showing an operation of judging permission of data migration after the start of the data migration.

FIG. 8 is an example of a flow chart for performing a process for judging whether data migration is allowed or not after data migration start.

Each process and each judgment in FIG. 8 are performed by the CPU 101 in execution of the virtual volume monitoring program 106, the data migration setting program 107 and the data migration monitoring program 108 of the management computer 100.

First, the CPU 101 in execution of the data migration setting program 107 issues an instruction to the controller 111 of the storage 110 to start data migration, and the storage 110 starts the data migration (step S800). The process of the step S800 is the same process as that of the step S705 in FIG. 7.

Then, the CPU 101 in execution of the virtual volume monitoring program 106 monitors allocated capacities of source virtual volumes and an allocated capacity of a virtual pool having storage areas allocated to destination virtual volumes (step S801).

The process of the step S801 is the same process as that of the step S706 in FIG. 7.

Successively, the CPU 101 in execution of the virtual volume monitoring program 106 acquires the allocated capacities of the source virtual volumes from the virtual volume table 200 of the storage configuration information 116 shown in FIG. 2, through the storage configuration program 115 of the storage 110 in accordance with a user's data migration request shown in FIG. 6 (step S802). Incidentally, the storage configuration program 115 of the storage 110 is executed by the controller 111.

The process of the step S802 is the same process as that of the step S701 in FIG. 7.

Then, the CPU 101 in execution of the virtual volume monitoring program 106 acquires an allocation status of the virtual pool having the storage areas allocated to the destination virtual volumes, in accordance with the user's data migration request shown in FIG. 6 (step S803). In the step S803, the CPU 101 acquires the allocation status of the virtual pool from the virtual volume table 200 of the storage configuration information 116 shown in FIG. 2 and the virtual pool table 300 shown in FIG. 3, through the storage configuration program 115 of the storage 110. Incidentally, the storage configuration program 115 of the storage 110 is executed by the controller 111.

The process of the step S803 is the same process as that of the step S702 in FIG. 7.

Then, the CPU 101 in execution of the data migration monitoring program 108 judges whether or not the allocated capacity of each of the source volumes acquired in the step S802 can be covered by the allocated capacity of the virtual pool which has a storage area allocated to each of the destination virtual volume and which is acquired in the step S803 (step S804). When the judgment in the judgment step S804 leads to a conclusion that the aforementioned capacity can be covered, the CPU 101 proceeds with step S805. When the judgment in the judgment step S804 leads to a conclusion that the aforementioned capacity cannot be covered, the CPU 101 proceeds with step S806. In the judgment step S804, the CPU 101 judges whether or not the capacity based on the allocated capacity 213 of the virtual pool in the virtual pool capacity table 210 of FIG. 2 can be covered so as not to exceed the threshold 214.

When the judgment in the judgment step S804 leads to a conclusion that the aforementioned capacity can be covered, the data migration monitoring program 108 is executed to judge whether the data migration is completed or not (step S805). When the judgment in the judgment step S805 leads to a conclusion that the data migration is completed, the process is terminated. When the judgment in the judgment step S805 leads to a conclusion that the data migration has not been completed yet, the process goes back to the step S801 to repeat the processes and judgments from the step S801 to the step S805.

When the judgment in the step S804 leads to a conclusion that the aforementioned capacity cannot be covered, the CPU 101 in execution of the data migration monitoring program 108 warns a user of the storage 110 or the management computer 100 that the data migration cannot be completed normally at the present time (step S806). Then, the process is terminated.

When, for example, the immediate execution 613 in data migration with combinations of source volumes 611 and destination volumes 612 as "V11-V13" and "V12-V14" from the example of FIG. 6 and in the condition of the virtual volumes in FIGS. 2, 3 and 4 indicates "Yes", or the capacity of the added virtual volume V15 from the example of FIG. 7 is not allocated but the data migration start instruction in the step S800 has come, the processes of the step S801 et seq. in the flow chart shown in FIG. 8 are performed.

Along with the data migration start in the step S800, the capacities allocated to the source virtual volumes V11 and V12 currently are allocated to the destination virtual volumes V13 and V14. That is, a real capacity of 2 GB is allocated to the virtual volume V13 as a migration destination of the data migration with the combination of the source volume 611 and the destination volume 612 as "V11-V13", and a real capacity of 2 GB is allocated to the virtual volume V14 as a migration destination of the data migration with the combination of the source volume 611 and the destination volume 612 as "V12-V14". Accordingly, values in FIGS. 2, 3 and 4 as the conditions of the volumes are changed as follows.

In the virtual volume table 200 shown in FIG. 2, the really allocated capacity 204 in information about the virtual volume ID 201 "V13" is updated from 0 G to 2 G and the really allocated capacity 204 in information about the virtual volume ID 201 "V14" is updated from 0 G to 2 G, so that the allocated capacity 213 in information about the virtual pool ID 211 "P13" in the virtual pool capacity table 210 is updated from 2 G to 6 G due to increments of the allocated capacities of the destination virtual volumes V13 and V14.

In the virtual pool table 300 shown in FIG. 3, the allocation status 305 of the chunk ID 303 "C132" is updated from "unallocated" to "allocated (V13)" and the allocation status 305 of the chunk ID 303 "C133" is updated from "unallocated" to "allocated (V14)".

Information about the virtual volume IDs 401 "V13" and "V14" is added to the information of the virtual volume allocation table 400 shown in FIG. 4. That is, information is updated so that records of the virtual volume ID 401 "V13", the virtual pool ID 402 "P13", the chunk ID 403 "C132" and the allocated LBA 404 "0 G-2 G" are added, and records of the virtual volume ID 401 "V14", the virtual pool ID 402 "P13", the chunk ID 403 "C133" and the allocated LBA 404 "0 G-2 G" are added.

In the aforementioned environment, the capacities of the source virtual volumes V11 and V12 can be covered on the sides of the destination virtual volumes V13 and V14 so that the processes of the step S801, the step S802, the step 803, the step S804 and the step S805 are repeated until the data migrations are completed. Alternatively, in the judgment step S805, the process is on standby until allocation occurs in the destination virtual volume V13 or V14 or the added virtual volume V15.

Assume that allocation of a capacity of 2 GB occurs in the source virtual volume V11 and the added virtual volume V15 before the judgment in the judgment step S805 leads to a conclusion that the data migrations are completed. In this case, the values of FIGS. 2, 3 and 4 are changed as follows.

In the case where the virtual volume ID 201 in the virtual volume table 200 shown in FIG. 2 is "V11", the allocated capacity 204 is updated from 2 G to 4 G. In the case where the virtual volume ID 201 in the virtual volume table 200 shown in FIG. 2 is "V15", the allocated capacity 204 is updated from 2 G to 4 G. In the case where the virtual pool ID 211 in the virtual pool capacity table 210 is "P13", the allocated capacity 213 is updated from 2 G to 4 G. This increment is equivalent to the increment of the allocated capacity of the aforementioned virtual volume V15. In the case where the virtual pool ID 211 is "P13", the sum of the allocated capacities due to the increments of the allocated capacities of the aforementioned destination virtual volumes V13 and V14 and the increment of the allocated capacity of the added virtual volume V15 is updated from 6 G to 10 G. Thus, the unallocated capacity of the virtual pool P13 with respect to its total capacity 212 of 10 G changes from 4 G to 0 G.

In the virtual pool table 300 shown in FIG. 3, the allocation status 305 of the chunk ID 303 "C112" is updated from "unallocated" to "allocated (V11)" and the allocation status 305 of the chunk ID 303 "C134" is updated from "unallocated" to "allocated (V15)". In the virtual volume allocation table 400 shown in FIG. 4, information of the virtual volumes V11 and V15 is added to virtual volume IDs 401. That is, records of the virtual volume ID 401 "V11", the virtual pool ID 402 "P11", the chunk ID 403 "C112" and the allocated LBA 404 "0 G-2 G" are added. In addition, records of the virtual volume ID 401 "V15", the virtual pool ID 402 "P13", the chunk ID 403 "C134" and the allocated LBA 404 "0 G-2 G" are added.

When the CPU 101 performs the process of the step S803, the allocated capacity of the source virtual volume V11 becomes 4 G and the allocated capacity of the source virtual volume V12 becomes 2 G so that the total of the allocated capacities of the virtual volumes V11 and V12 becomes 6 G. In addition, the allocated capacity of the virtual pool P13 having the storage areas allocated to the destination virtual volumes V13 and V14 becomes 4 G even after the allocation at the time of data migration from the source virtual volumes V11 and V12 is subtracted therefrom. Accordingly, the virtual pool P13 having the storage areas allocated to the destination virtual volumes V13 and V14 is required to have a total allocated capacity of 10 G. This value exceeds the threshold 214 of 8 G. Accordingly, in this case, the judgment in the judgment step S804 leads to a conclusion that the capacity cannot be covered in the virtual pool P13, and then the process proceeds to the step S806.

Based on the aforementioned process, the CPU 101 gives warning to the user of the storage 110 or the management computer 100 in the step S806. Then, the process is terminated. When the case this time is taken as an example, the way to give warning to the user of the storage 110 or the management computer 100 is as follows. Since the capacity for the data migration of the source virtual volume V12 can be covered in the virtual pool P13, the CPU 101 sends that massage to the user of the storage 110 or the management computer 100 of that message and informs the user that only the data migration for the source virtual volume V11 is not allowed in the current situation. The CPU 101 may also give the user of the storage 110 or the management computer 100 a notice of the capacity which should be covered. In this case, the CPU 101 may inform the user that a capacity of 2 G is insufficient, from the aforementioned description.

FIG. 9 is a screen showing a data migration status in the storage to the user. In FIG. 9, the screen is for giving the user warning or a notice of the data migration status.

A source volume 901 indicating an ID of a source volume, a migration permission 902 indicating judgment as to whether data migration is allowed or not, a source volume kind 903 indicating a kind of the source volume, a source virtual capacity 904 indicating a virtual capacity of the source volume or a capacity of a real volume per se, and a source really allocated capacity 905 indicating a really allocated capacity of the source virtual volume are displayed on a data migration status display screen 900 shown in FIG. 9.

In addition, the states of relevant source volumes, especially, the sum 906 of really allocated capacities of sources, the volume 907 of each destination, the kind 908 of each destination volume, the virtual capacity 909 of each destination and a destination virtual pool 910 are displayed on the data migration status display screen 900. Here, the source really allocated capacity sum 906 indicates the sum of the really allocated capacities of source volumes related to the same virtual pool for destination virtual volumes. The destination volume 907 indicates an ID of a destination volume. The destination virtual capacity 909 indicates a virtual capacity of the destination volume or a volume per se of a real volume. The destination virtual pool 910 indicates an ID of a virtual pool related to the destination virtual volume.

A destination virtual pool total capacity 911, a destination virtual pool allocated capacity 912, a "source really allocated capacity sum+destination virtual pool allocated capacity" 913, a destination virtual pool threshold 914, an execution status 915 indicating an execution status of data migration, an "advice screen" 916, and an "influence screen on another volume" 917 for displaying an influence on another virtual volume are displayed on the data migration status display screen 900.

The destination virtual pool total capacity 911 indicates the total capacity of the aforementioned destination virtual pool 910. The destination virtual pool allocated capacity 912 indicates the sum of capacities of the aforementioned destination virtual pool 910 allocated to relevant virtual volumes.

In addition, the "source really allocated capacity sum+destination virtual pool allocated capacity" 913 indicates the sum of the aforementioned source really allocated capacity sum 906 and the aforementioned destination virtual pool allocated capacity 912. The destination virtual pool threshold 914 indicates a threshold of the aforementioned destination virtual pool literally. The advice screen 916 is a screen for displaying a measure taken against data migration which is "No" in terms of migration permission.

Figure 10:
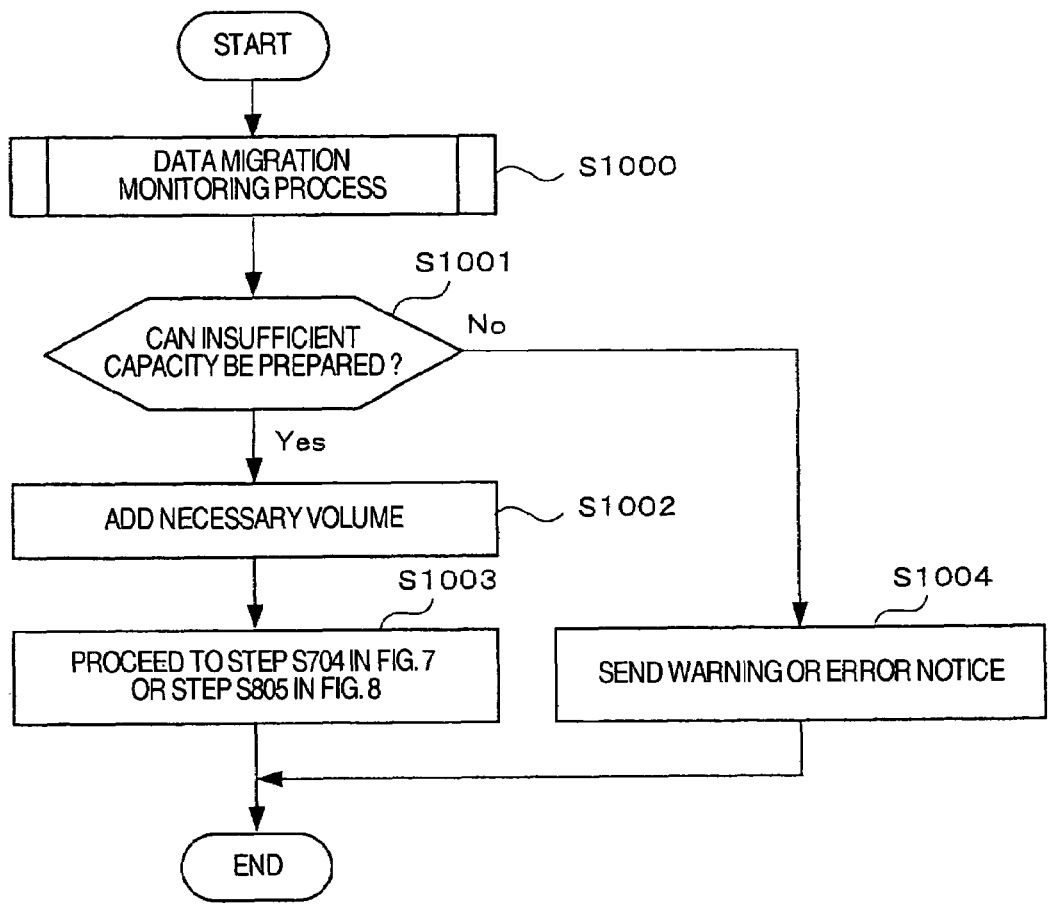
FIG. 10 is an example of a flow chart showing an operation of adding a capacity of a destination of data migration in the case where the capacity of the destination of data migration is insufficient.
Figure 14:
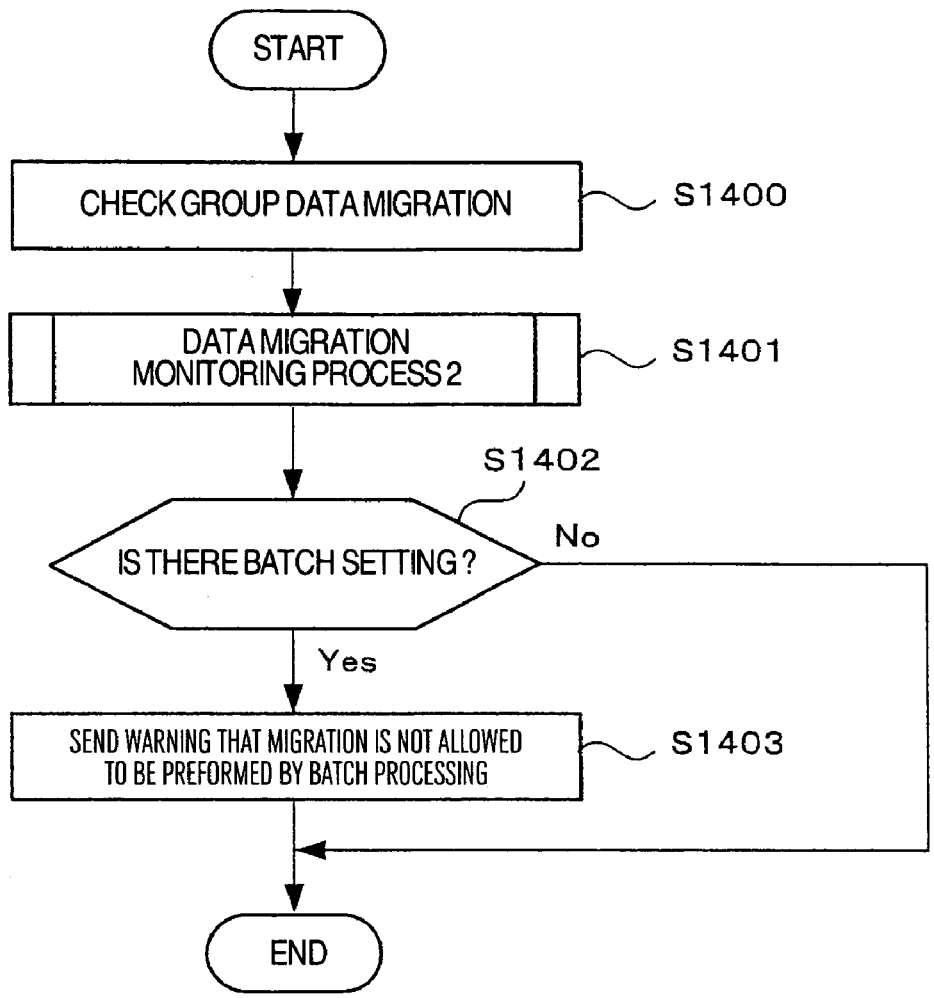
FIG. 14 is an example of a flow chart showing an operation when data migration is set to be performed by batch processing in accordance with each group.
Figure 15:
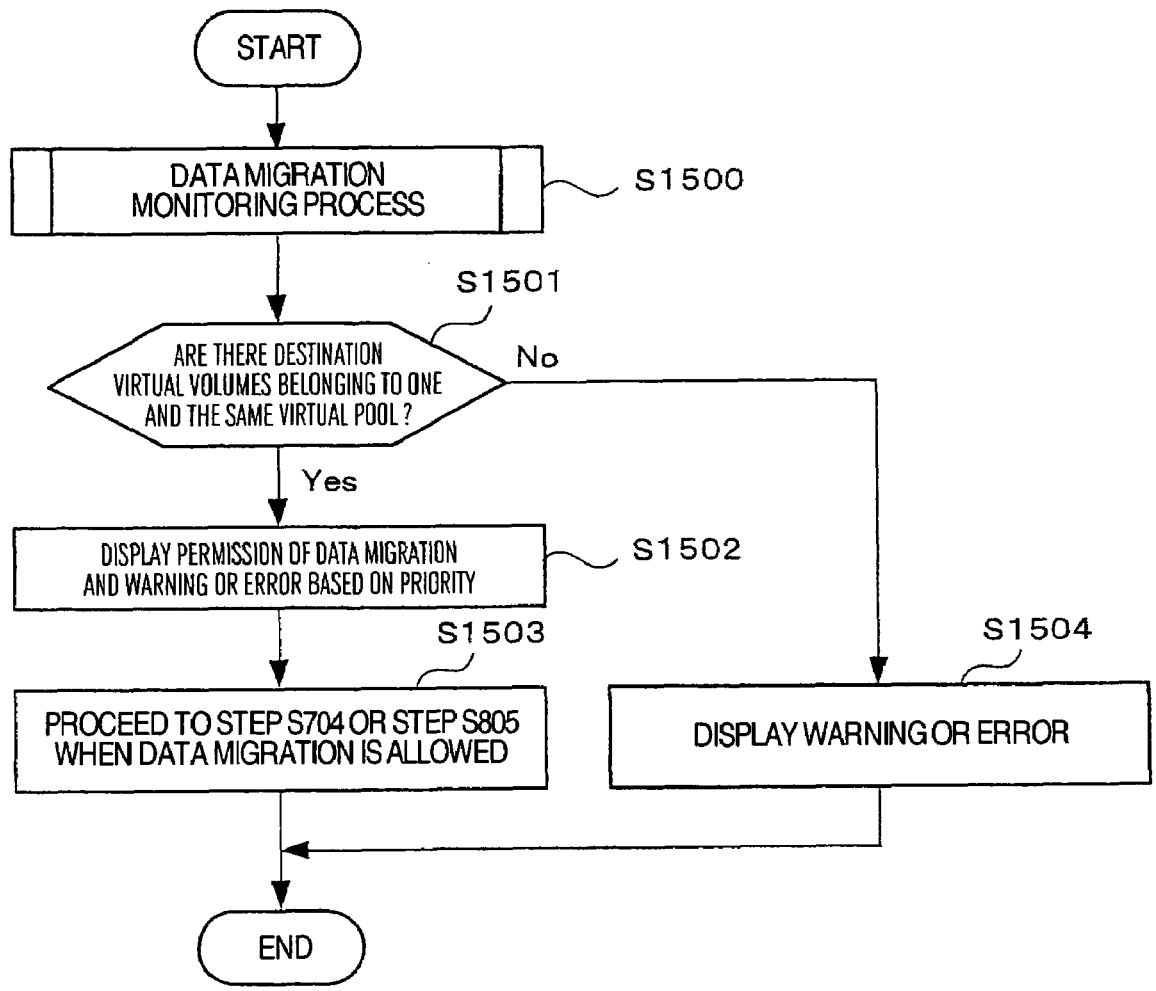
FIG. 15 is an example of a flow chart of an operation using priority in the case where a plurality of destination virtual volumes use the same virtual pool in data migration.

This display screen can be used as an example of a warning or error display screen in the step S708 or S709 in FIG. 7, the step S806 in FIG. 8, step S1004 in FIG. 10, step S1403 in FIG. 14, or step S1504 in FIG. 15. The step 1004, the step S1403 and the step S1504 will be described later. This display screen can be also used when the user wants to grasp the data migration status as a whole.

The source volume ID 901 is the same in contents as the source volume ID 502 in the data migration table 500 shown in FIG. 5. The migration permission 902 is the same in contents as the migration permission 506 in the data migration table 500. The source volume kind 903 is the same in contents as the source volume kind 503 in the data migration table 500. In addition, the source virtual capacity 904 is the same in contents as the virtual capacity 203 in the virtual volume table 200 shown in FIG. 2 (or the capacity 222 in the real volume table 220 in the case of a real volume). The source really allocated capacity 905 is the same in contents as the really allocated capacity 204 in the virtual volume table 200.

The destination volume 907 is the same in contents as the destination volume ID 504 in the data migration table 500 shown in FIG. 5. The destination volume kind 908 is the same in contents as the destination volume kind 505 in the data migration table 500. In addition, the destination virtual capacity 909 is the same in contents as the virtual capacity 203 in the virtual volume table 200 (or the capacity 222 in the real volume table 220 in the case of a real volume) The destination virtual pool 910 is the same in contents as the virtual pool ID 202 in the virtual pool table 200.

The destination virtual pool total capacity 911 is the same in contents as the total capacity 212 in the virtual pool capacity table 210 shown in FIG. 2. The destination virtual pool allocated capacity 912 is the same in contents as the allocated capacity 213 in the virtual pool capacity table 210. In addition, the destination virtual pool threshold 914 is the same in contents as the threshold 214 in the virtual pool capacity table 210. The execution status 915 is the same in contents as the execution status 507 in the data migration table 500.

To take the data migration status display screen 900 in FIG. 9 as an example, the migration permission 902 in each of data migrations with the combinations of the source volumes 901 and the destination volumes 907 as V11-V13 and V12-V14 indicates "No". It is understood that the reason is because the value of the "source really allocated capacity sum+destination virtual pool allocated capacity" 913 exceeds the destination virtual pool threshold 914.

When the execution status 915 indicates standby, i.e. a status of waiting for execution of the data migration, this will be regarded as warning to the user. The warning can be regarded as a trigger for the user to take a measure according to the advice screen 916 which will be described later. Items of the "source really allocated capacity sum+destination virtual pool allocated capacity" 913 and the destination virtual pool threshold 914 as causes of the migration permission 902 may be displayed on the screen in thick letters or in a blinking mode so that the user can understand the causes easily.

In the advice screen 916, addition of a capacity to the destination virtual pool P13 is advised in order to increase the threshold based on the "source really allocated capacity sum+destination virtual pool allocated capacity" 913 and the destination virtual pool threshold 914. For example, when the method for determining the threshold is performed in such a manner that 2 GB is subtracted from the total capacity, "add a capacity of 2 GB or more" is displayed on the advice screen 906. This screen may be also used when a warning message is desired to be displayed.

In the "influence screen on another volume" 917, the value of "source really allocated capacity sum+destination virtual pool allocated capacity" 913 and the value of the destination virtual pool threshold 914 are also deduced when a virtual volume used as a virtual volume normally has been created from the virtual pool P13 having the storage areas allocated to the destination virtual volumes. When the "source really allocated capacity sum+destination virtual pool allocated capacity" 913 exceeds the value of the threshold 914, warning against the fact that a storage area is not allowed to be allocated from the virtual pool P13 to the virtual volume can be issued.

When the virtual volume table 200 in FIG. 2 is taken as an example, no storage area can be allocated to the virtual volume V15 added to have a storage area allocated from the virtual pool P13 because the allocated capacities of the storage areas have already exceeded the threshold 914. This fact may be displayed on the data migration status display screen 900 or warning about the virtual volume V15 may be displayed on another screen.

FIG. 10 is an example of a flow chart of a process for adding a capacity of a migration destination when the migration destination capacity for data migration is insufficient in the first embodiment.

Each process and each judgment shown in FIG. 10 are performed by the CPU 101 in execution of the virtual volume setting program 105, the virtual volume monitoring program 106, the data migration setting program 107 and the data migration monitoring program 108 of the management computer 100.

First, the CPU 101 in execution of the data migration monitoring program 108 performs a data migration monitoring process (step S1000). This is equivalent to the process from the judgment step S703 to the step S704 and the step S706 for monitoring the allocated capacity of the virtual pool in FIG. 7, and the process from the judgment step S703 to the step S707, the step S708 and the step S709 for sending an error or warning notice in FIG. 7, or the process from the step S801 for monitoring the allocated capacity of the virtual pool to the judgment step S804 and the step S806 for sending a warning notice.

That is, this process is a process for sending a warning or error in the case where the allocated capacity of the source virtual volume V11 or V12 is insufficient at the time of data migration from the source virtual volumes V11 and V12 with respect to the allocation statuses of the destination virtual volumes V13 or V14. This process is performed by the CPU 101 in execution of the virtual volume monitoring program 106, the data migration setting program 107, and the data migration monitoring program 108 as shown in FIGS. 7 and 8.

Then, the CPU 101 in execution of the data migration monitoring program 108 judges whether or not the insufficient capacity can be added to the virtual pool P13 having storage areas allocated to the destination virtual volumes V13 and V14 (step S1001). That is, the CPU 101 judges whether a capacity for creating a virtual pool volume 119 to be added to the virtual pool P13 can be covered in the storage 110 or not. When the judgment in the judgment step S1001 leads to a conclusion that the insufficient capacity can be covered in the virtual pool P13, the CPU 101 proceeds with step S1002. When the judgment in the judgment step S1001 leads to a conclusion that the capacity cannot be covered, the CPU 101 proceeds with step S1004.

When, for example, the process proceeds to the step S708 or S709 in the example shown in FIG. 7, the allocated capacity of the source virtual volume V11 is 4 G and the allocated capacity of the source virtual volume V12 is 2 G, so that the total of the allocated capacities of the virtual volumes V11 and V12 is 6 G. In addition, because the allocated capacity of the virtual pool P13 having the storage areas allocated to the destination virtual volumes V13 and V14 is 4 G, it is necessary to cover a total capacity of 10 G in the virtual pool P13 for capacity allocation of the source virtual volumes and the destination virtual volumes. However, since the threshold 214 of the virtual pool P13 in the virtual pool capacity table 210 shown in FIG. 2 is 8 G, it is understood that a capacity of 2 G with respect to the total capacity of 10 G required for the virtual pool P13 cannot be covered. Thus, the CUP 101 judges whether a volume with a capacity of 2 GB can be covered in the storage 110 or not.

With respect to reservation of the capacity required for the virtual pool P13, the volume with a necessary capacity can be created from a parity group creating the logical volume as long as the virtual pool volume 119 logically creates a volume from an RAID configuration. In this case, the judgment in the judgment step S1001 leads to a conclusion that the insufficient capacity can be covered by the virtual pool P13, the process proceeds to the step S1002. Otherwise, the process proceeds to the step S1004.

In addition, when the judgment in the judgment step S1001 leads to a conclusion that the insufficient capacity can be covered in the virtual pool P13, the CPU 101 in execution of the virtual volume setting program 105 adds the capacity to the virtual pool P13 (step S1002). The method for adding the capacity in the step S1002 is performed in such a manner that the capacity judged to be insufficient in the judgment step S1001 or something over is added. For example, the CPU 101 creates a capacity 1.5 times as large as the insufficient capacity as the virtual pool volume 119, and adds the capacity to the capacity of the virtual pool P13.

Alternatively, the insufficient capacity may be added to the capacity of the virtual pool P13 in such a manner that the storage configuration is set to regard an unused real volume 117 which has a capacity larger than the insufficient capacity judged in the judgment step S1001, as the virtual pool volume 119.

In accordance with the aforementioned example, the CPU 101 may create the virtual pool volume 119 with a capacity of 2 GB and add the created virtual pool volume 119 to the capacity of the virtual pool P13. In the case where addition with a surplus, i.e. addition of a capacity 1.5 times as large as the insufficient capacity is taken into consideration, the CPU 101 may create a virtual pool volume 119 with a capacity of 3 GB and add the created virtual pool volume 119 to the capacity of the virtual pool P13.

The CPU 101 in execution of the data migration monitoring program 108 proceeds with step S1003 which is a data migration start instruction judgment step of the step S704 if the current situation is the case of the process in FIG. 7, or a data migration completion judgment step of the step S805 if the current situation is the case of the process in FIG. 8. Then, the process in FIG. 10 is terminated.

The CPU 101 sends a warning or error to the user of the storage 110 or the management computer 100 in the step S1004 because the capacity cannot be covered at the present time. When the process is a process for adding a destination capacity from the warning notice sending process in the step S709 in FIG. 7 or the step S806 in FIG. 8, the CPU 101 first sends a warning to the user of the storage 110 or the management computer 100 to prompt the user to arrange the environment to be an environment in which volume expansion is allowed.

When the environment is an environment in which the volume cannot be covered in the storage 110, for example, an environment in which various volumes in use currently cannot be deleted and the capacity cannot be covered from a storage medium or an external storage, the CPU 101 may send an error notice to the user of the storage 110 or the management computer 100. In addition, specific contents about a means for volume expansion may be presented in the warning. When, for example, there is a case in which the capacity can be covered by addition of a volume, this message may be presented to the user.

When the capacity can be covered by an external storage, the CPU 101 may connect the external storage to the storage 110 with an insufficient capacity, set the volume of the external storage as the virtual pool volume 119 and present the fact that the virtual pool P13 is to be expanded. In the case where the process is a process for adding a destination capacity from the error notice sending process of the step S708 in FIG. 7, the CPU 101 decides that the capacity cannot be covered and sends an error notice to the user of the storage 110 or the management computer 100 when data migration is intended to start due to a data migration start instruction issued in the step S707.

Before proceeding with the step S1001, the CPU 101 may perform the warning notice sending process of the step S709 or the step S806 in the step S1000. Alternatively, the CPU 101 may proceed with the step S1001 directly without sending any warning notice. Before proceeding with the step S1001, the CPU 101 may send a warning notice as in the step S709 while generating no error in the error notice sending process in the step S708. The CPU 101 may proceed with the step S1001 directly without sending any error notice even in the step S708.

When, for example, the capacity of the virtual pool P13 is short of 2 G in the step 1002, the CPU 101 can cover the capacity of 2 G and creates a volume from the same parity group as that for the virtual pool P13 having the storage areas allocated to the destination virtual volumes V13 and V14. The created volume may be registered as the virtual pool volume 119 of the virtual pool P13 short of capacity. Alternatively, the volume may be created from a totally different parity group from that for the virtual pool P13 so that the created volume can be registered as the virtual pool volume 119 of the virtual pool P13 short of capacity.

For example, Because of the reasons of maintenance of data in the data migration, hierarchical management of the storage 110, etc., the CPU 101 may provide a rule in the step S1001 that the virtual pool volume 119 of the virtual pool P13 having the storage areas allocated to the destination volumes V13 and V14 is prevented from being created from the parity group used by the source virtual volume V11 or V12.

In this case, in the situation that almost all the capacity of the parity group used by the destination virtual pool P13 has been already spent even when a large capacity for volume creation still remains in the parity group used by the destination virtual volumes V13 and V14, the process may proceed to the step S1004 for sending warning on the basis of the decision that the capacity is insufficient. In this case, the user takes a measure of inserting another disk in order to create a new parity group.

Figure 11:
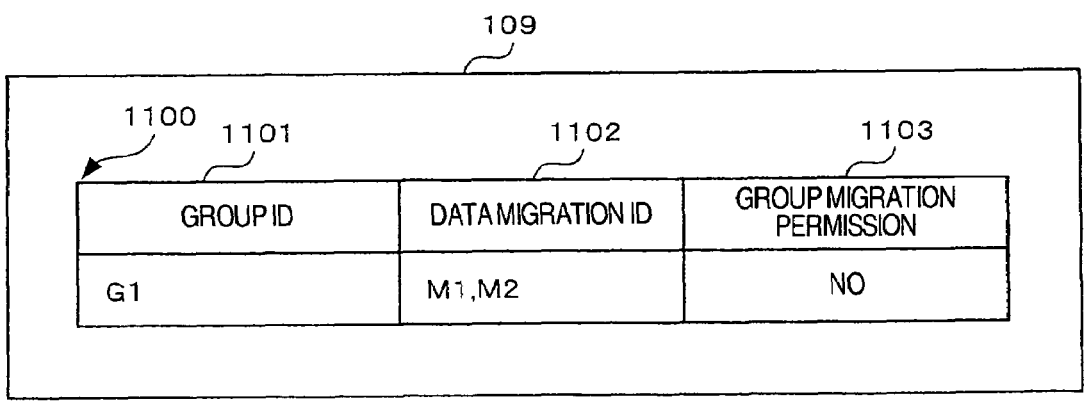
FIG. 11 is a view showing an example of a data migration group table.

FIG. 11 is an example of a table showing information to be managed in the storage management information 109 of the management computer 100 when data migration is performed by batch processing in accordance with each group.

A data migration group table 1100 shown in FIG. 11 is constituted by a group ID 1101 which is an identifier for identifying a data migration group, a data migration ID 1102 indicating information of data migration to be performed by batch processing in accordance with each group, and group migration permission 1103 indicating a status as to whether or not migration is allowed to be performed by batch processing in accordance with each group.

The data migration ID 1102 is the same in contents as the migration ID 501 in the data migration table 500 show in FIG. 5.

When group migration is allowed, the status of the group migration permission 1103 indicates "Yes". Otherwise, the status of the group migration permission 1103 indicates "No". Decision of the status of the group migration permission 1103 is performed by a process of a flow chart which will be described with reference to FIG. 14. As an example of group migration, there is the case where migration is performed by batch processing from the source virtual volumes V11 and V12 to the destination virtual volumes V13 and V14.

FIG. 12 is a table for managing data migration priority in data migration.

A data migration priority table 1200 shown in FIG. 12 is constituted by a migration ID 1201, a source volume ID 1202, a destination volume ID 1203, and priority 1204.

The migration ID 1201 is the same in definition as the migration ID 501 in the data migration table 500 shown in FIG. 5. The source volume ID 1202 is the same in definition as the source volume ID 502 in the data migration table 500 shown in FIG. 5. The destination volume ID 1203 is the same in definition as the destination volume ID 504 in the data migration table 500 shown in FIG. 5.

The priority 1204 is a sequence of priority to make data migration successful. The priority 1204 may be designated by the user or may be set automatically by a program such as a scheduler for executing data migration on standby.

FIG. 13 shows an input screen for the user to set data migration in the storage 110. FIG. 13 is different from FIG. 6 in that a group ID 1301 as a unit for batch processing as shown in FIG. 11 and a priority 1302 can be set. On this occasion, because immediate executions 613 for the same group ID 1301 need to be the same in operation, an error is issued when the immediate executions 613 for the same group ID 1301 are set to be different in operation. Setting of an immediate execution 613 for a group ID 1301 designated for the first time may be handed over to setting of a next immediate execution 613 for the same group ID 1301 so that the same value of the immediate execution 613 may be set automatically on the screen.

In addition, to set data migration without designation of a group ID 1301, that is, to set data migration in the same manner as in FIG. 6, arrangement may be made to prevent the group ID 1301 from being designated.

In this case, a format "1-1" may be used as the priority 1302. The numeral value on the left side of "-" is an identifier for specifying setting of relevant data migration whereas the numeral value on the right side of "-" is a numeral value expressing a priority in the relevant data migration. The numeral value on the right side of "-" such as 1, 2, 3, . . . is placed for determining the sequence of priority. "1" expresses the highest priority, and "2" expresses the second highest priority.

FIG. 14 is an example of a flow chart for a process to be performed when data migration is set to be performed by batch processing in accordance with each group. This process is a process related to the process in FIG. 7, 8 or 10.

The process shown in FIG. 14 is performed by execution of the virtual volume monitoring program 106, the data migration setting program 107 and the data migration monitoring program 108 in the management computer 100.

In addition, the CPU 101 checks group data migration in step S1400. The step S1400 is the process performed by the CPU 101 at the same timing as the step S700 in FIG. 7 (also used in FIG. 10) or the step S800 in FIG. 8 (also used in FIG. 10). In the process of the step S700 in FIG. 7, the CPU 101 in execution of the data migration setting program 107 accepts a data migration request from a user. Information of data migration is acquired from the screen input data as shown in FIG. 12.

When data migration is performed in the process of the step S800 in FIG. 8, the CPU 101 can check information of the data migration group table 110 shown in FIG. 11 and grasp a group ID 1101 to which data migration IDs 1102 belong, because the groups have been set already.

The CPU 101 performs a data migration monitoring process 2 in step S1401. This data migration monitoring process is equivalent to the error notice sending process of the step S708 or the warning notice sending process of the step S709 in FIG. 7. In addition, the data migration monitoring process is equivalent to the warning notice sending process of the step S806 in FIG. 8 or the error or warning notice sending process of the step S1004 in FIG. 10. That is, the data migration monitoring process is a process from judgment as to whether or not the insufficient capacity can be covered in the virtual pool P13 to sending of a warning or error notice to the user because the capacity is insufficient in the destination virtual pool P13. This process is the process shown in FIG. 7, 8 or 10 and performed by execution of the virtual volume monitoring program 106, the data migration setting program 107 and the data migration monitoring program 108.

Then, the CPU 101 judges whether or not data migration has been set to be performed by batch processing in accordance with each group. That is, the CPU 101 judges whether or not data migration is allowed to be performed in accordance with each group (step S1402). The judgment in the judgment step S1402 as to data migration in accordance with each group is performed, for example, based on whether or not the capacity allocated to the destination virtual volume V13 or V14 with respect to the source virtual volume V11 or V12 can be entirely covered in the virtual pool P13. When the judgment in the judgment step S1402 leads to a conclusion that there is no data migration to be performed by batch processing, the process is terminated without performing anything particularly. When the judgment in the judgment step S1402 leads to a conclusion that there is data migration to be performed by batch processing, the CPU 101 proceeds with step S1403.

In the step S1403, the user is informed of a warning that data migration of the same group as data migration resulting in a warning or error cannot be set to be performed by batch processing with the data migration resulting in a warning or error. Then, the process is terminated.

For example, in accordance with the example of FIG. 13, data migrations with combinations "V1-V3" and "V2-V4" are set to be performed by batch processing under the group ID 1301 "G1". Since the immediate executions 613 are set to be "No" on this occasion, the process proceeds to the process of checking group data migration in the step S1400 and the data migration monitoring process 2 in the step 1401 in the timings of FIG. 7.

On this occasion, for example, in accordance with the examples of FIGS. 2, 3 and 4, in the data migration with the combination "V1-V3", a really allocated capacity 204 of the source virtual volume V1 in the virtual volume table 200 shown in FIG. 2 is 4 G, and an allocated capacity 213 and a threshold 214 of a virtual pool P2 having a storage area allocated to a destination virtual volume V3 in the virtual pool capacity table 210 shown in FIG. 2 are 0 G and 6 G respectively, so that an allocated capacity to the destination virtual volume V3 can be covered in the destination virtual pool P2. For this reason, the process does not proceed to the error notice sending process of the step S708 or the warning notice sending process of the step S709 in FIG. 7.

In data migration with the combination "V2-V4", a really allocated capacity 204 of the source virtual volume V2 in the virtual volume table 200 shown in FIG. 2 is 2 G, and an allocated capacity 213 and a threshold 214 of a virtual pool P3 having a storage area allocated to a destination virtual volume V4 in the virtual pool capacity table 210 shown in FIG. 2 are 2 G and 4 G respectively, so that an allocated capacity to the destination virtual volume V4 can be covered in the destination virtual pool P3. For this reason, the process does not proceed to the error notice sending process of the step S708 or the warning notice sending process of the step S709 in FIG. 7.

When data are to be written in an added virtual volume V5 having a storage area allocated from the virtual pool P3 so that a capacity of 2 GB is allocated to the virtual volume V5, the allocated capacity 213 of the virtual pool P3 however becomes 4 GB. Accordingly, a capacity of 6 GB is necessary for the virtual pool P3 when the allocated capacity 213 of 2 GB of the destination virtual volume V4 is added to the capacity of 4 GB.

Since the threshold 214 of the virtual pool P3 is 4 G, it is understood that the capacity for data migration of the source virtual volume V2 cannot be covered in the destination virtual volume V4. When this time point is detected, the process proceeds to the warning notice sending process of the step S709 in FIG. 7 and then proceeds to the judgment in the step S1402 in FIG. 14 as to whether there is batch setting for migration or not.

Since the data migration with the combination "V1-V3" and the data combination with the combination "V2-V4" are designated as batch setting in the judgment step S1402, the process proceeds to the step S1403. In the step S1403, warning is sent to the user for informing that batch setting is not allowed. In this case, the CPU 101 presents data migration allowed to be performed and data migration not allowed to be performed, to thereby make the user specify the cause.

The user receiving the warning can take a measure to perform a process of securing an insufficient destination capacity for the data migration or changing setting of the data migration.

FIG. 15 is an example of a flow chart of processing using priority in the case where a plurality of destination virtual volumes use the same virtual pool in data migration.

Each process and each judgment in FIG. 15 are performed by the CPU 101 in execution of the virtual volume monitoring program 106, the data migration setting program 107 and the data migration monitoring program 108.

First, the CPU 101 performs a data migration monitoring process in step S1500. This data migration monitoring process is equivalent to a process from the judgment step S703 to the step S704 and the step S706 for monitoring the allocated capacity of the virtual pool, and a process from the judgment step S703 to the step S707, the step S708 and the step S709 for sending an error or warning notice in FIG. 7. In addition, this data migration monitoring process is equivalent to a process from the step S801 for monitoring the allocated capacity of the virtual pool to the judgment step S804 and the step S806 for sending a warning notice in FIG. 8. Further, this data migration monitoring process is equivalent to a process from the step S1000 for monitoring data migration to the step S1004 for sending a warning or error notice in FIG. 10.

That is, the aforementioned process is a process for sending a warning or error notice when the allocation capacity of the destination virtual volume V13 or V14 is insufficient for performing data migration from the source virtual volume V11 or V12 with respect to the allocation status of the destination virtual volume V13 or V14. The process shown in FIG. 15 is a process which can be substituted for the step S708, the step S709, the step S806 and the step S1004. This process is performed by execution of the virtual volume monitoring program 106, the data migration setting program 107 and the data migration monitoring program 108, as shown in FIGS. 7, 8 and 10.

Then, the CPU 101 in execution of the data migration monitoring program 108 judges whether or not there are destination virtual volumes V13 and V14 belonging to one and the same virtual pool P13 (step S1501). That is, the CPU 101 judges whether or not there are destination virtual volumes V13 and V14 having storage areas allocated from the virtual pool P13. When the judgment in the judgment step S1501 leads to a conclusion that there are destination virtual volumes V13 and V14 belonging to one and the same pool P13, the CPU 101 proceeds with step S1502. Otherwise, the CPU 101 proceeds with step S1504.

When the judgment in the judgment step S1501 leads to a conclusion that there are destination virtual volumes V13 and V14 belonging to one and the same pool P13, the CPU 101 sends permission of data migration and a warning or error notice to the user of the storage 110 or the management computer 100, based on priority.

That is, the CPU 101 in execution of the data migration monitoring program 108 extracts information of the destination virtual volumes V13 and V14 belonging to one and the same virtual pool P13 from the data migration priority table 1200 shown in FIG. 12 and the virtual volume table 200 shown in FIG. 2, and checks the statuses of the destination virtual volume V13 and V14 with respect to data migration in a priority sequence.

Data migration allowed to be performed and data migration not allowed to be performed are extracted. That is, the CPU 101 displays data migration allowed to be performed and data migration not allowed to be performed, and sends a warning or error notice about the data migration not allowed to be performed. For example, the warning is displayed in the timing for sending a warning notice in the step S709, the step S806 or the step 1004 (the timing called from the flow chart of FIG. 7). The error is displayed in the timing for sending an error notice in the step S708 or the step S1004 (the timing called from the flow chart of FIG. 7).

In the step S1503, the CPU 101 in execution of the data migration monitoring program 108 proceeds with the step S704 if the CPU 101 is performing the process of FIG. 7 currently, or proceeds with the step S805 if the CPU 101 is performing the process of FIG. 8 currently. Then, the process in FIG. 15 is terminated.

When the judgment in the judgment step S1501 leads to a conclusion that there are no destination virtual volumes V13 and V14 belonging to one and the same virtual pool P13, the CPU 101 proceeds with step S1504 for displaying warning or an error. Then, the process is terminated.

For example, the user screen in FIG. 13 shows that the combination "V11-V13" is higher in priority than the combination "V12-V14". Accordingly, in this case, for example, in the process up to the step S709 as described in the example of FIG. 7, the total of the allocated capacity 4 G of the source virtual volume V11 and the allocated capacity 2 G of the source virtual volume V12 is 6 G, the allocated capacity of the virtual pool P13 having the storage areas allocated to the destination virtual volumes V13 and V14 is 4 G. To sum up the allocated capacities of the virtual volumes V11 and V12 and the virtual pool P13, a capacity of 10 G in total needs to be covered in the virtual pool P13.

It is however understood that this required capacity exceeds 8 G which is the threshold 214 of the virtual pool P13 having the storage areas allocated to the destination virtual volumes V13 and V14. Accordingly, since the capacity cannot be covered in the virtual pool P13 having the storage areas allocated to the destination virtual volumes V13 and V14, the CPU 101 performs a process of sending the user a warning notice that the capacity cannot be covered.

Here, since the priority 1302 shown in FIG. 13 is provided, the CPU 101 can perform processing based on the priority in the step S1502. Since the capacity of the source virtual volume V11 high in the priority 1302 can be covered in the virtual pool P13 in the step S1502 without exceeding the threshold 214 of the virtual pool P13, the CPU 101 proceeds with the step S1503 in which warning is not sent for the source virtual volume V11 but the source virtual volume V12 is set as the warning target.

In the step S1502, priority may be given to allocation of the destination virtual volumes V13 and V14 having the storage areas allocated from the same destination virtual pool P13, with no relation to data migration.

For example, particularly the virtual volume V15 exists in the virtual pool P13 with no relation to data migration. Here, priority of the virtual volume V15 to which a storage area is to be allocated, and priority of each of the source virtual volume V12 and the destination virtual volume V14 having allocated storage areas due to data migration are set in advance. When the virtual volume V15 is lower in priority than the source virtual volume V12 or the destination virtual volume V14, allocation of the storage area to the virtual volume V15 may be forbidden if the capacities of the source virtual volume V12 and the destination virtual volume V14 exceed the total capacity which can be used for data migration.

In the aforementioned first embodiment, there may be a case where a warning notice is sent because the capacity of the destination virtual volume cannot be covered for data migration in FIGS. 7, 8, 14 and 15. The invention is not limited to the case but the following process may be performed. As long as, for example, a user's processing time for adding a capacity of a destination virtual volume for data migration is known, it is not necessary send a warning notice whenever the capacity of the destination virtual volume becomes insufficient. Here, the CPU 101 may grasp a data migration execution time or a data transfer time during data migration, and send a warning notice at the time when the capacity should be added immediately before the data migration execution time or during the data migration while taking the user's processing time for capacity addition into consideration.

Figure 16:
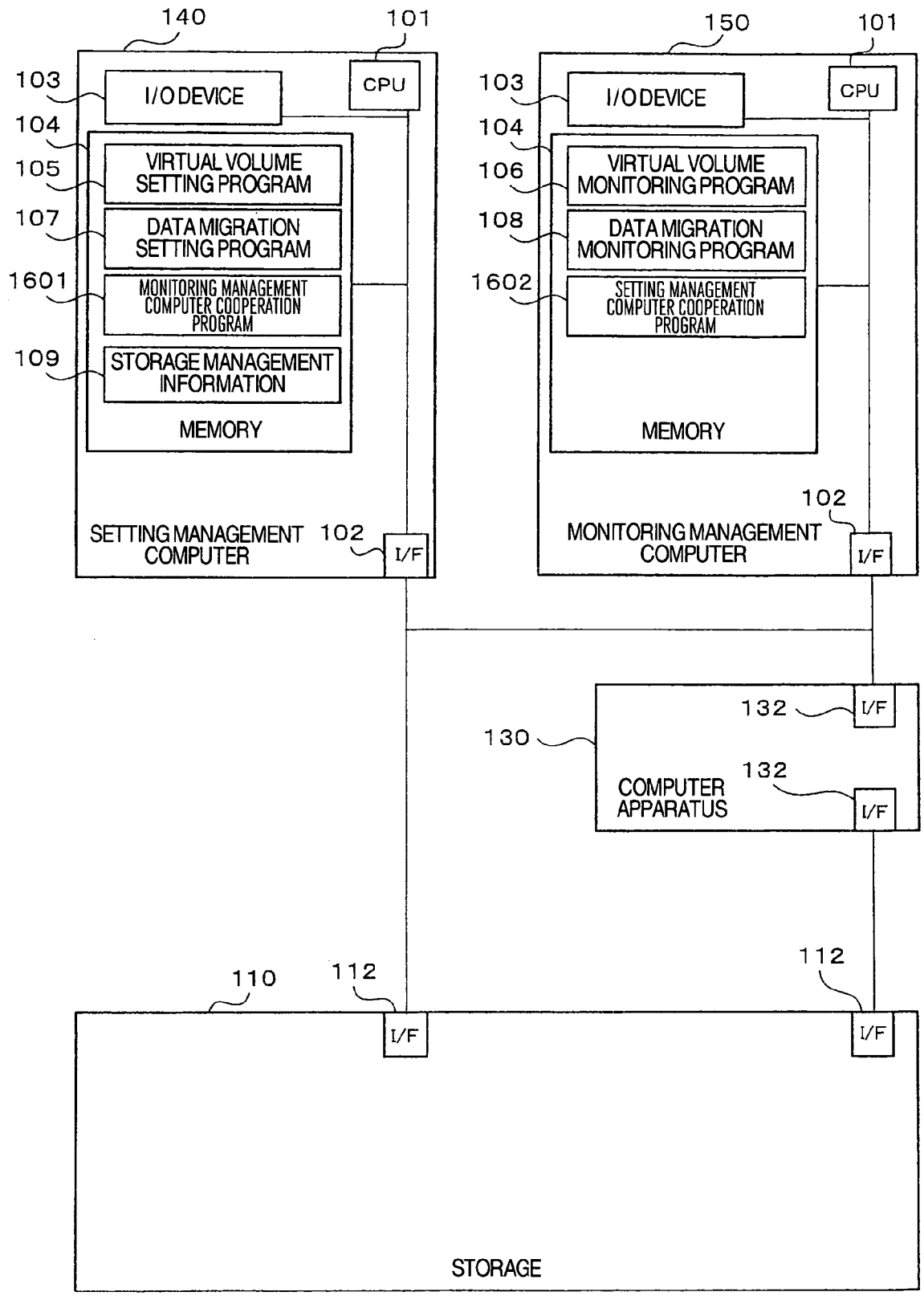
FIG. 16 is a view showing another example of configuration of a computer system.

FIG. 16 is a view showing a configuration of a computer system according to a second embodiment of the invention.

FIG. 16 is different from FIG. 1 in that a setting management computer 140 and a monitoring management computer 150 are provided in place of the management computer 100.

In FIG. 16, the setting management computer 140 is different from the management computer 100 but has a memory 104 on which a virtual volume setting program 105, a data migration setting program 107, and a monitoring management computer cooperation program 1601 which is not provided in the management computer 100 are placed.

In addition, the monitoring management computer 150 is different from the management computer 100 but has a memory 104 on which a virtual volume monitoring program 106, a data migration monitoring program 108, and a setting management computer cooperation program 1602 which is not provided in the management computer 100 are placed.

In the configuration of FIG. 16, the process performed by the management computer 100 is divided so that a CPU 101 in the monitoring management computer 150 provided with the monitoring programs executes the virtual volume monitoring program 106 and the data migration monitoring program 108 to thereby monitor virtual volumes and data migration.

The CPU 101 in execution of the setting management computer cooperation program 1602 of the monitoring management computer 150 transfers monitoring information of the monitored virtual volumes and data migration to the setting management computer 140 through the monitoring management computer cooperation program 1601 of the setting management computer 140.

In the setting management computer 140 provided with the setting programs, the CPU 101 in execution of the virtual volume setting program 105 and the data migration setting program 107 sets the virtual volumes and data migration.

Thus, the monitoring programs and the setting programs are separated from each other, so that management can be performed by the computers whose use purposes are made clear.

The invention is not limited to the aforementioned embodiments. It is a matter of course that suitable changes can be made without departing from the gist of the invention.

The invention claimed is:

1. A computer system comprising a storage system, a computer for storing data in the storage system, and a management computer, the storage system including a plurality of storage media constituting a plurality of storage areas, and a controller connected to the storage media, the management computer including an interface connected to a network, and a processor connected to the interface, wherein:

the controller makes a first logical storage area and a second logical storage area correspond to at least one first storage medium and at least one second storage medium respectively in the plurality of storage media;

the controller allocates data storage areas to the first and second logical storage areas from the first and second storage media respectively in accordance with a write request from the computer;

the controller sets the allocated second logical area as an area to which data to be written from the computer into the first logical storage area are migrated;

the controller sets a pairing relation for migrating data from the first logical storage area to the second logical storage area;

the controller of the storage system makes third and fourth logical storage areas correspond to the first and second storage media respectively;

the controller allocates data storage areas to the third and fourth logical storage areas from the first and second storage media respectively in accordance with a write request from the computer;

the controller sets the allocated fourth logical storage area as an area to which data to be written from the computer into the third logical storage area are migrated;

the controller sets a pairing relation for data migration from the third logical storage area to the fourth logical storage area;

the processor monitors the capacity of the data storage area allocated to the first logical storage area and the capacity of the second storage medium to be allocated to the data storage area of the second logical storage area through the network during a period after the setting of the pairing relation for the data migration before the start of the data migration;

the processor judges whether an area for storing data stored in the first logical storage area can be covered by the second logical storage area or not; and the processor outputs, to an output portion connected to the processor, a result that the data migration fails if the area for storing data stored in the first logical storage area cannot be covered by the second logical storage area;

the processor of the management computer monitors the capacity of the data storage area allocated to the third logical storage area and the capacity of the second storage medium to be allocated to the data storage area of the fourth logical storage area during a period after the setting of the pairing relation for the data migration before the start of the data migration;

the processor judges whether an area for storing data stored in the third logical storage area can be covered by the fourth logical storage area or not; and the processor outputs, to the output portion, a result that the data migration from the first logical storage area to the second logical storage area and the data migration from the third logical storage area to the fourth logical storage area cannot be performed by batch processing if the area for storing data stored in the first logical storage area cannot be covered by the second logical storage area or if the area for storing data stored in the third logical storage area cannot be covered by the fourth logical storage area.

2. A computer system according to claim 1, wherein:

the controller of the storage system starts the data migration from the first logical storage area to the second logical storage area; and the processor of the management computer performs the judgment and the outputting during the data migration in the pairing relation for the data migration.

3. A computer system according to claim 1, wherein:

the first and second storage media are first and second storage area pools which are used at the time of the data migration from the first logical storage area to the second logical storage area; and the first and second storage area pools provide data storage areas to the first and second logical storage areas respectively at the time of the data migration.

4. A computer system according to claim 1, wherein:

the controller of the storage system adds a fifth logical storage area to the second storage medium when the area for storing data stored in the first logical storage area cannot be covered by the second logical storage area or when the area for storing data stored in the third logical storage area cannot be covered by the fourth logical storage area;

the processor of the management computer acquires the capacities of the data storage areas allocated to the first and third logical storage areas, the capacities of the data storage areas allocated to the second and fourth logical storage areas and the capacity of the second storage medium allocated in accordance with the third or fourth logical storage area after addition of the fifth logical storage area;

the processor judges whether the sum of the allocated capacity of the second storage medium and the allocated capacities of the first and third logical storage areas can be covered by the total capacity of the second storage medium or not; and the processor outputs, to the output portion, a result that the data migration fails if the sum cannot be covered by the total capacity of the second storage medium.

5. A computer system according to claim 1, wherein:

the controller of the storage system assigns priority to the data migration from the first logical storage area to the second logical storage area and the data migration from the third logical storage area to the fourth logical storage area, respectively;

the processor of the management computer outputs, to the output portion, a result that the data migration with low priority fails if the capacity allowed only for the data migration with high priority can be covered by the logical storage area of the destination of the data migration.

6. A computer system according to claim 5, wherein when the area for storing data of the first logical storage area cannot be covered by the second logical storage area, the processor of the management computer adds a capacity larger than a capacity of the uncoverable area to the second storage medium.

7. A computer system according to claim 1, wherein when the processor of the management computer judges whether data can be covered by the second logical storage area as the destination of the data migration, the judgment is decided by a threshold.

8. A computer system comprising a storage system, a computer for storing data in the storage system, and a management computer, the storage system including a plurality of storage media constituting a plurality of storage areas, and a controller connected to the storage media, the management computer including an interface connected to a network, and a processor connected to the interface, wherein:

the controller makes a first logical storage area and a second logical storage area correspond to at least one first storage medium and at least one second storage medium respectively in the plurality of storage media;

the controller allocates data storage areas to the first and second logical storage areas from the first and second storage media respectively in accordance with a write request from the computer;

the controller sets the allocated second logical storage area as an area to which data to be written from the computer into the first logical storage area are migrated;

the controller sets a pairing relation for migrating data from the first logical storage area to the second logical storage area;

the controller starts the data migration from the first logical storage area to the second logical storage area;

the controller of the storage system makes third and fourth logical storage areas correspond to the first and second storage media respectively;

the controller allocates data storage areas to the third and fourth logical storage areas from the first and second storage media respectively in accordance with a write request from the computer;

the controller sets the allocated fourth logical storage area as an area to which data to be written from the computer into the third logical storage area are migrated;

the controller sets a pairing relation for data migration from the third logical storage area to the fourth logical storage area;

the controller starts the data migration from the third logical storage area to the fourth logical storage area and the data migration from the first logical storage area to the second logical storage area simultaneously; the processor monitors the capacity of the data storage area allocated to the first logical storage area and the capacity of the second storage medium to be allocated to the data storage area of the second logical storage area through the network during a period after the setting of the pairing relation for the data migration before the start of the data migration;

the processor judges whether an area for storm data stored in the first logical storage area can be covered by the second logical storage area or not; and the processor outputs, to an output portion connected to the processor, a result that the data migration fails if the area for storm data stored in the first logical storage area cannot be covered by the second logical storage area;

the processor of the management computer performs the monitoring, the judgment and the outputting during the data migration in the pairing relation for the data migration;

the processor of the management computer monitors the capacity of the data storage area allocated to the third logical storage area and the capacity of the second storage medium to be allocated to the data storage area of the fourth logical storage area during the data migration in the pairing relation for the data migration;

the processor judges whether an area for storing data stored in the third logical storage area can be covered by the fourth logical storage area or not; and the processor outputs, to the output portion, a result that the data migration from the first logical storage area to the second logical storage area or the data migration from the third logical storage area to the fourth logical storage area fails if the area for storing data stored in the first logical storage area cannot be covered by the second logical storage area or if the area for storing data stored in the third logical storage area cannot be covered by the fourth logical storage area.

9. A computer system according to claim 8, wherein:

the controller of the storage system adds a fifth logical storage area to the second storage medium when the area for storing data stored in the first logical storage area cannot be covered by the second logical storage area or when the area for storing data stored in the third logical storage area cannot be covered by the fourth logical storage area;

the processor of the management computer starts data migration from the third logical storage area to the fourth logical storage area;

the processor acquires the capacities of the data storage areas allocated to the first and third logical storage areas, the capacities of the data storage areas allocated to the second and fourth logical storage areas and the capacity of the second storage medium allocated in accordance with the third or fourth logical storage area after addition of the fifth logical storage area;

the processor judges whether the sum of the allocated capacity of the second storage medium and the allocated capacities of the first and third logical storage areas can be covered by the total capacity of the second storage medium or not; and the processor outputs, to the output portion, a result that the data migration fails if the sum cannot be covered by the total capacity of the second storage medium.

* * * * *